(12) United States Patent
Srinivasan et al.

(10) Patent No.: US 6,823,336 B1
(45) Date of Patent: Nov. 23, 2004

(54) DATA STORAGE SYSTEM AND METHOD FOR UNINTERRUPTED READ-ONLY ACCESS TO A CONSISTENT DATASET BY ONE HOST PROCESSOR CONCURRENT WITH READ-WRITE ACCESS BY ANOTHER HOST PROCESSOR

(75) Inventors: Sudhir Srinivasan, Chelmsford, MA (US); Uresh Vahalia, Waban, MA (US); Uday K. Gupta, Westford, MA (US); Philippe Armangau, Acton, MA (US)

(73) Assignee: EMC Corporation, Hopkinton, MA (US)

(*) Notice: Subject to any disclaimer, the term of this patent is extended or adjusted under 35 U.S.C. 154(b) by 861 days.

(21) Appl. No.: 09/669,939

(22) Filed: Sep. 26, 2000

(51) Int. Cl.[7] .............................................. G06F 17/30
(52) U.S. Cl. .......................................... 707/8; 707/201
(58) Field of Search ................................ 707/201, 203, 707/8

(56) References Cited

U.S. PATENT DOCUMENTS

| | | | |
|---|---|---|---|
| 4,686,620 A | 8/1987 | Ng .............................. | 364/200 |
| 4,755,928 A | 7/1988 | Johnson et al. ............. | 364/200 |
| 5,155,845 A | 10/1992 | Beal et al. .................. | 395/575 |
| 5,175,837 A | 12/1992 | Arnold et al. ............... | 395/425 |
| 5,175,852 A | 12/1992 | Johnson et al. ............. | 395/600 |
| 5,218,695 A | 6/1993 | Noveck et al. ............. | 395/600 |
| 5,255,270 A | 10/1993 | Yanai et al. ................ | 371/10.2 |
| 5,276,860 A | 1/1994 | Fortier et al. ............... | 395/575 |
| 5,276,867 A | 1/1994 | Kenley et al. .............. | 395/600 |
| 5,276,871 A | 1/1994 | Howarth ...................... | 395/600 |

(List continued on next page.)

FOREIGN PATENT DOCUMENTS

| | | | |
|---|---|---|---|
| EP | 0 672 985 A1 | 9/1995 | ........... G06F/11/14 |
| EP | 0 674 263 A1 | 9/1995 | ........... G06F/11/20 |

OTHER PUBLICATIONS

Koop, P., "Replication at Work. (four companies use Oracle and Sybase replication servers to solve business problems)," DBMS, vol. 8, No. 3, p. 54(4), Mar. 1995.

(List continued on next page.)

*Primary Examiner*—Greta Robinson
(74) *Attorney, Agent, or Firm*—Novak, Druce & Quigg LLP; Richard G. Auchterlonie

(57) ABSTRACT

A data storage system receives sets of the revisions such that each set of revisions changes the dataset from one consistent state to another. Each set of revisions is processed in a write-selected phase followed by a read-selected phase. In the write-selected phase, the revisions in each set are written to a buffer and processed to produce a directory of the set of revisions. In the read-selected phase, the revisions are read from the buffer and integrated into the dataset. When one set of revisions is in the read-selected phase, the next set of revisions is in the write-selected phase. To permit uninterrupted read-only access to a consistent state of the dataset, the data storage system responds to a request for reading specified data on a priority basis by first accessing the directory of the read-selected revisions to determine whether the specified data are in the read-selected set of revisions, and if so, the specified data are read from the read-selected set of revisions, and if not, the specified data are read from the dataset. In a preferred implementation, the sets of revisions are alternately written to either a first buffer or a second buffer, and processing of each set of revisions is switched from the write-selected phase to the read-selected phase by switching between the two buffers.

33 Claims, 13 Drawing Sheets

U.S. PATENT DOCUMENTS

| | | | |
|---|---|---|---|
| 5,301,286 A | 4/1994 | Rajani | 395/400 |
| 5,341,493 A | 8/1994 | Yanai et al. | 395/425 |
| 5,367,698 A | 11/1994 | Webber et al. | 395/800 |
| 5,379,418 A | 1/1995 | Shimazaki et al. | 395/575 |
| 5,434,994 A | 7/1995 | Shaheen et al. | 395/500 |
| 5,487,160 A | 1/1996 | Bemis | 395/441 |
| 5,535,381 A | 7/1996 | Kopper | 395/600 |
| 5,590,320 A | 12/1996 | Maxey | 395/619 |
| 5,594,863 A | 1/1997 | Stiles | 395/182.13 |
| 5,596,706 A | 1/1997 | Shimazaki et al. | 395/182.04 |
| 5,611,069 A | 3/1997 | Matoba | 395/441 |
| 5,615,329 A | 3/1997 | Kern et al. | 395/182.04 |
| 5,673,382 A | 9/1997 | Cannon et al. | 395/182.04 |
| 5,680,640 A | 10/1997 | Ofek et al. | 395/839 |
| 5,701,516 A | 12/1997 | Cheng et al. | 395/842 |
| 5,758,149 A | 5/1998 | Bierma et al. | 395/608 |
| 5,829,047 A | 10/1998 | Jacks et al. | 711/162 |
| 5,835,953 A | 11/1998 | Ohran | 711/162 |
| 5,835,954 A | 11/1998 | Duyanovich et al. | 711/162 |
| 5,852,715 A | 12/1998 | Raz et al. | 395/200.31 |
| 5,857,208 A | 1/1999 | Ofek | 707/204 |
| 5,870,764 A * | 2/1999 | Lo et al. | 707/203 |
| 5,873,116 A * | 2/1999 | Van Fleet | 711/147 |
| 5,875,478 A | 2/1999 | Blumenau | 711/162 |
| 5,893,140 A | 4/1999 | Vahalia et al. | 711/118 |
| 5,901,327 A | 5/1999 | Ofek | 395/825 |
| 5,909,483 A | 6/1999 | Weare et al. | 379/88.18 |
| 5,978,951 A | 11/1999 | Lawler et al. | 714/758 |
| 6,029,175 A * | 2/2000 | Chow et al. | 707/104.1 |
| 6,035,412 A | 3/2000 | Tamer et al. | 714/6 |
| 6,052,797 A * | 4/2000 | Ofek et al. | 714/6 |
| 6,076,148 A | 6/2000 | Kedem | 711/162 |
| 6,081,875 A | 6/2000 | Clifton et al. | 711/162 |
| 6,092,066 A | 7/2000 | Ofek | 707/10 |
| 6,101,497 A | 8/2000 | Ofek | 707/10 |
| 6,108,748 A | 8/2000 | Ofek et al. | 711/112 |
| 6,496,908 B1 * | 12/2002 | Kamvysselis et al. | 711/162 |
| 6,502,205 B1 * | 12/2002 | Yanai et al. | 714/7 |

OTHER PUBLICATIONS

King and Halim, "Management of a Remote Backup Copy for Disaster Recovery," ACM Transactions on Database Systems, vol. 16, No. 2, Jun. 1991, pp. 338–368.

Polyzois, C.A., and Garcia–Molina, H., "Processing of Read–Only Queries at a Remote Backup," Proceedings of the 13th Symposium on Reliable Distributed Systems, Oct. 25–27, 1994, Dana Point, CA, IEEE Computer Society Press, Los Alamitos, CA, pp. 192–201.

Remote Mirroring Technical White Paper, Copyright 1994–2002 Sun Microsystems, published at least as early as May 17, 2002 at sun.com, 25 pages.

Thanhardt, E., and Harano, G., "File Migration in the NCAR Mass Storage System," Digest of Papers 9th IEEE Symposium on Mass Storage Systems (Editors, Friedman, K., and O'Lear, B.T.), 1988, Storage Systems: Perspectives, Nov. 1988, pp. 114–121 (also submitted is a one–page ieeexplore. ieee.org abstract).

Gorelik et al., "Sybase Replication Server," International Conference on Management of Data and Symposium on Principles of Database Management 1994 SIGMOD, pp. 469 (also submitted is a two–page portal.acm.org abstract).

EMC TimeFinder Product Description Guide, EMC Corporation, Hopkinton, MA, 1998, pp. 1–31.

Disaster Recovery Guidelines for using HP SureStore E XP256, Continous Access XP with Oracle Databases Rev 1.03, Hewlett–Packard Company, Palo Alto, CA, May 2000, pp. 1–28.

Enterprise Volume Manager and Oracle8 Best Practices, Compaq White Paper, Compaq Computer Corporation, Dec. 1999, pp. 1–11.

VERITAS Volume Replication and Oracle Databases, A Solutions White Paper, Veritas Software Corporation, Mountain View, CA, May 29, 2000, pp. 12–31.

Steere et al., "Efficient User–Level File Cache Management on the Sun Vnode Interface," USENIX Summer Conference, Jun. 11–15, 1990, Anaheim, California, pp. 325–331.

Uresh Vahalia, *UNIX Internals: The new frontiers, Chapter 9, "File System Implementations,"* Prentice–Hall, Inc., Upper Saddle River, New Jersey, 1996, pp. 261–289.

Sun Microsystems, Inc., "NFS: Network File System Protocol Specification," Network Working Group, http://www.attrition.org/~modify/texts/rfc/rfc1094.txt, Mar. 1989, 23 pages.

D.L. Burkes and R.K. Treiber, "Design Approaches for Real–Time Transaction Processing Remote Site Recovery," Digest of Papers in Spring COMPCON90, Feb. 26–Mar. 2, 1990, *Thirty–Fifth IEEE Computer Society International Conference*, San Francisco, CA, pp. 568–572.

"Filesystem *Manager*—VxFS," http://www.fujitsu–computers.com/Servers/software/ds–mgw–12.html, published at least as early as Oct. 28, 2000, 2 pages.

"VERITAS Volume Manager," http://www.sun.com/stor.../volumemgr.html;$sessionid$QEOQTDQAAC2QHAMTA-1FU5Y, published at least as early as Oct. 28, 2000, 3 pages.

"VERITAS NetBackup and Storage Migrator," http://www.sun.com/stora.../netbackup.html;$sessionid$QEOQTDQAAC2QHAMTA-1FU5Y, published at least as early as Oct. 28, 2000, 5 pages.

"VERITAS® File System™ System Administrator's Guide," Release 3.2, VERITAS® Software Corporation, Introduction, Index, Performance and Tuning (Chapter 5), fsadm_vxfs(1M)—resize or reorganize a VERITAS File System (http://uw7doc.sco.com/ODM_FSadmin/fssag-1.html, fssag-13.html, fssag-8.html, and http://uw7doc.sco.com/cgi–bin/man/man?fsadm_vxfs+1M) published at least as early as Oct. 28, 2000, 31 pages.

"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www–ftp.legata.com/News/Press/PR209.html; published at least as early as Oct. 11, 1999, 17 pages.

R. Stager and D. Hitz, Internet Draft filename *"draft–stager–iquard–netapp–backup–05.txt,"* Network Data Management Protocol (*NDMP*), last update Oct. 12, 1999, pp. 1–73.

* cited by examiner

DATA STORAGE SYSTEM AND METHOD FOR UNINTERRUPTED READ-ONLY ACCESS TO A CONSISTENT DATASET BY ONE HOST PROCESSOR CONCURRENT WITH READ-WRITE ACCESS BY ANOTHER HOST PROCESSOR

BACKGROUND OF THE INVENTION

1. Field of the Invention

The present invention relates generally to data storage systems, and more particularly to storage of data for transaction processing applications where one host processor has read-only access to a dataset concurrent with read-write access by another host processor.

2. Background Art

Transaction processing uses computer programming techniques that maintain database consistency under various conditions such as recovery from system failure or concurrent database access by multiple host processors. Database consistency is typically maintained by subdividing the application program of a host processor into a series of transactions. Each transaction includes a set of read-write instructions that change the database from one consistent state to another. The set of read-write instructions for each transaction is terminated by an instruction that specifies a transaction commit operation. During the execution of the transaction, the database may become inconsistent. For example, in an accounting application, a transaction may have the effect of transferring funds from a first account to a second account. The application program has a first read-write instruction that debits the first account by a certain amount, and a second read-write instruction that credits the second account by the same amount. Before and after the transaction, the database has consistent states, in which the total of the funds in two accounts is constant. In other words, the total of the funds in the two accounts at the beginning of the transaction is the same as the total at the end of the transaction. During the transaction, the database will have an inconsistent state, in which the total of the funds in the two accounts will not be the same as at the beginning or at the end of the transaction.

For concurrent database access by multiple host processors, it is conventional to permit only one host processor to have read-write access to the database, and to permit the other host processors to have read-only access to the database. For many applications, read-only access to the database must be restricted to consistent states of the database. For example, decision support systems analyze and evaluate data that is accumulated in the course of business transactions. In such a decision support system, one host processor may perform read-write transactions upon a database to produce a record of the business transactions, and any number of other host processors may perform read-only access to the database to analyze and evaluate the data in the database. The analysis and evaluation must be performed upon consistent states of the database. For an accounting application, for example, an evaluation of the total amount of funds in a set of accounts would be erroneous if the totals were not computed from consistent states of the database.

There are various ways of restricting read-only access to consistent states of a database in a multi-processor environment. A typical way is to restrict read-only access to a snapshot copy of the database. The snapshot copy of the database is updated at the end of each transaction, at the conclusion of the transaction commit operation. The snapshot copy can be maintained by a data storage system that provides read-write access to the database and concurrent read-only access to the snapshot copy of the database. The snapshot copy of the database can be updated very quickly at the conclusion of the transaction commit operation, so as to provide uninterrupted read-only access to consistent states of the database.

For some situations, there are difficulties in using a conventional snapshot copy facility for providing uninterrupted read-only access to consistent states of the database. For example, Raz et al., U.S. Pat. No. 5,852,715, incorporated herein by reference, discloses a multi-processor system in which a local data storage system provides read-write access to a database, and a remote data storage system provides read-only access to the database. A data communications link connects the remote data storage system to the local data storage system. The local data storage system stores a local copy of the database. The local copy of the database is mirrored over the data communications link to a remote copy of the database in the remote data storage system. At the remote data storage system, a support copy is derived from the remote database. The remote data storage system provides read-only access to the support copy to implement decision support functions. Raz et al. U.S. Pat. No. 5,852,715 discloses two ways of updating the remote copy. Changes made to the local database could be recorded in the remote database on an ongoing basis, in which case the support copy would be a snapshot of the remote database. Alternatively the remote copy could be a snapshot of the local copy. In either case, one could use a conventional remote mirroring facility and a conventional snapshot facility. However, it would appear that the use of such conventional facilities would require at least three versions of the database (local copy, snapshot copy, and mirrored copy), together with overhead for maintaining both the snapshot copy and the mirrored copy on an ongoing basis for concurrent and uninterrupted read-only access.

SUMMARY OF THE INVENTION

In accordance with a basic aspect of the invention, there is provided a method of operating a data storage system to provide uninterrupted read access to a consistent dataset concurrent with performing a series of revisions upon the dataset. The series of revisions includes a first set of revisions followed by a second set of revisions. The dataset is in a consistent state after performing each set of revisions upon the dataset. The method includes: (a) processing the first set of revisions to form a directory of the first set of revisions; and then (b) processing the second set of revisions to form a directory of the second set of revisions, and concurrently performing the first set of revisions upon the dataset, and concurrently performing read access to specified data in the dataset by accessing the directory of the first set of revisions to determine whether the specified data are in the first set of revisions, and upon finding that the specified data are in the first set of revisions, obtaining the specified data from the first set of revisions, and upon finding that the specified data are not in the first set of revisions, obtaining the specified data from the dataset.

In accordance with another aspect, the invention provides a method of read-write access by a first host processor to a dataset in a first data storage system concurrent with uninterrupted read-only access by a second host processor to a consistent state of a copy of the dataset in a second data storage system. Revisions to the dataset in the first data storage system from the read-write access are also made to the copy of the dataset in the second data storage system.

The revisions include a first set of revisions followed by a second set of revisions. The dataset is in a consistent state after performing each set of revisions upon the dataset. The method includes: (a) processing the first set of revisions to form a directory of the first set of revisions; and then (b) processing the second set of revisions to form a second directory of dataset revisions in the second set of revisions, and concurrently performing the first set of revisions upon the copy of the dataset, and concurrently performing read access on a priority basis to specified data in the dataset by accessing the first directory of dataset revisions to determine whether the specified data are in the first set of revisions, and upon finding that the specified data are in the first set of revisions, obtaining the specified data from the first set of revisions, and upon finding that the specified data are not in the first set of revisions, obtaining the data from the copy of the dataset.

In accordance with yet another aspect, the invention provides a data storage system including data storage, and a storage controller responsive to read and write commands for accessing specified data of a dataset in the data storage. Each set of write commands modifies the dataset from one consistent state to another. The storage controller is programmed to respond to each set of write commands by first operating upon revisions of each set of write commands in a write-selected phase and then operating upon the revisions of each set of write commands in a read-selected phase. The storage controller forms a directory of the revisions of each set of write commands in the write-selected phase. The storage controller accesses the directory of the revisions of each set of write commands in the read-selected phase. The storage controller performs the revisions of each set of write commands in the read-selected phase upon the dataset, and concurrently responds to the read commands on a priority basis by accessing the directory of the revisions of said each set of write commands in the read-selected phase to obtain specified data from the revisions of each set of write commands in the read-selected phase when the specified data are in the revisions of each set of write commands in the read-selected phase, and when the specified data are not in the revisions of each set of write commands in the read-selected phase, obtaining the specified data from the dataset.

In accordance with still another aspect, the invention provides a data storage system including data storage, and a storage controller responsive to read and write commands for accessing specified data of a dataset in the data storage. The storage controller is programmed to respond to transaction commit commands by alternately writing to a first volume of the data storage and to a second volume of the data storage sets of revisions made to the dataset by the write commands. Each set of revisions to the dataset includes revisions from a set of transactions defined by the transaction commit commands so that each set of revisions changes the dataset from one consistent state to another. In addition, the storage controller is programmed with a remote mirroring facility for mirroring the first and second volumes to corresponding volumes in a remote data storage system.

In accordance with a final aspect, the invention provides a program storage device containing a program for a storage controller of a data storage system. The program is executable by the storage controller for responding to read and write commands for accessing specified data of a dataset in data storage of the data storage system. Each set of write commands modifies the dataset from one consistent state to another. The program is executable by the storage controller for responding to each set of write commands by first operating upon revisions of each set of write commands in a write-selected phase and then operating upon the revisions of each set of write commands in a read-selected phase. The storage controller forms a directory of the revisions of each set of write commands in the write-selected phase, and the storage controller accesses the directory of the revisions of each set of write commands in the read-selected phase. The storage controller performs the revisions of each set of write commands in the read-selected phase upon the dataset, and concurrently responds to the read commands on a priority basis by accessing the directory of the revisions of each set of write commands in the read-selected phase to obtain specified data from the revisions of each set of write commands in the read-selected phase when the specified data are in the revisions of each set of write commands in the read-selected phase, and when the specified data are not in the revisions of each set of write commands in the read-selected phase, obtaining the specified data from the dataset.

Figure 1:
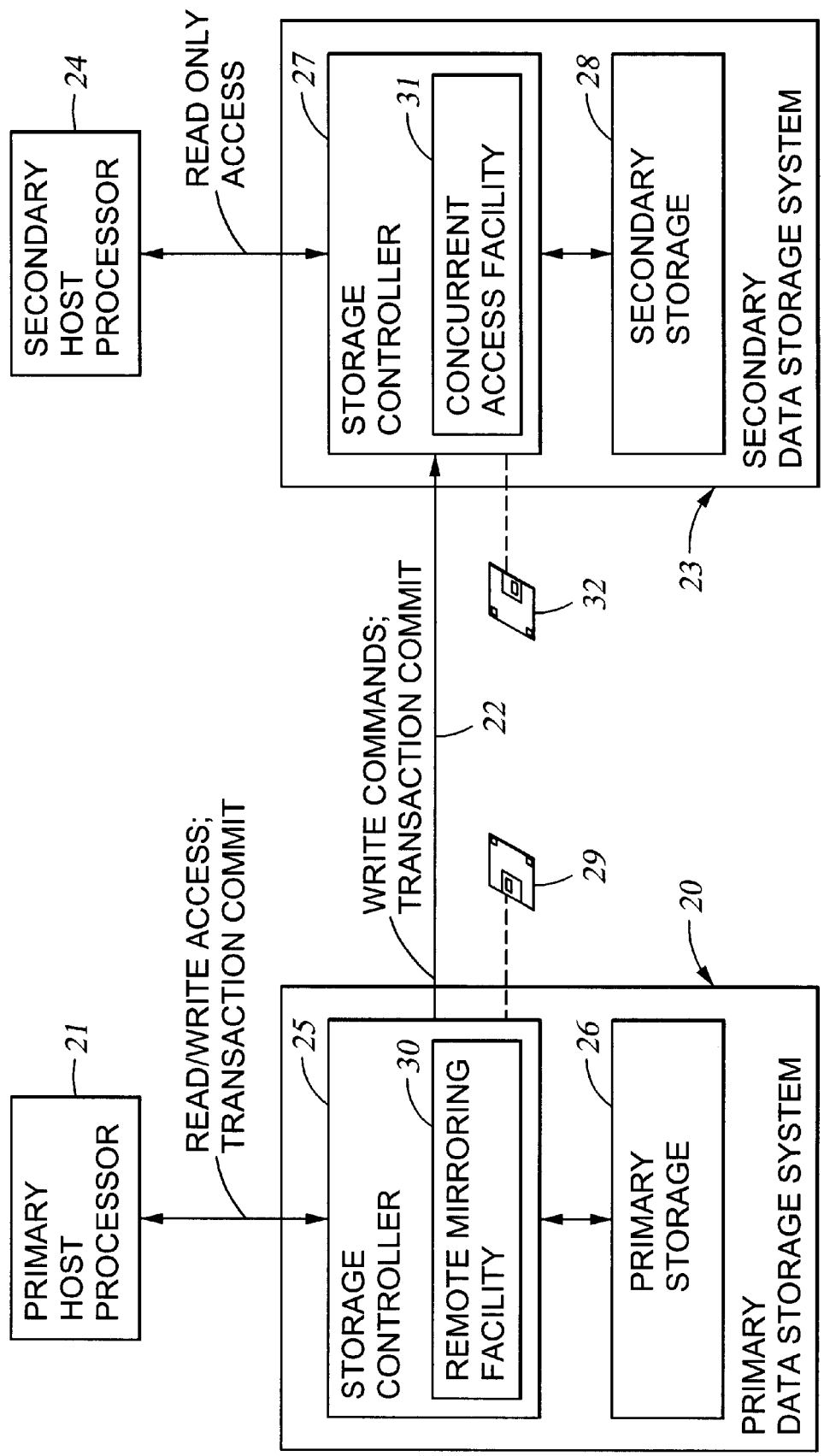
FIG. 1 is a block diagram of a data processing system in which a primary data storage system servicing a primary host processor is linked to a secondary storage system servicing a secondary host processor to provide the secondary host processor uninterrupted read-only access to a consistent dataset concurrent with read-write access by the primary host processor.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a data processing system in which a primary data storage system 20 servicing a primary host processor 21 is connected via a transmission link 22 to a secondary storage system 23 servicing a secondary host processor 24. The primary data storage system 20 includes a storage controller 25 controlling access to primary storage 26, and the secondary data storage system 23 has a storage controller 27 controlling access to secondary storage 28. The storage controller 25 is programmed, via a program storage device such as a floppy disk 29, with a remote mirroring facility 30, which transmits write commands from the primary host processor 21 over the link 22 to the storage controller 27 in the secondary storage system. The storage controller 27 receives the write commands and executes them to maintain, in the secondary storage 28, a copy of data that appears in the primary storage 26 of the primary data storage system. Further details of a suitable remote mirroring facility are disclosed in Ofek et al., U.S. Pat. No. 5,901,327 issued May 4, 1999, incorporated herein by reference.

In accordance with an aspect of the present invention, the storage controller 27 in the secondary data storage system is programmed with a concurrent access facility for providing the secondary host processor 24 uninterrupted read-only access to a consistent dataset in the secondary storage 28 concurrent with read-write access by the primary host processor. For example, the concurrent access facility 31 is loaded into the storage controller 27 from a program storage device such as a floppy disk 32. The concurrent access facility 31 is responsive to the write commands from the primary data storage system, and read-only access commands from the secondary processor 24. The concurrent access facility 31 is also responsive to transaction commit commands, which specify when the preceding write commands will create a consistent dataset in the secondary storage 28. The transaction commit commands originate from the primary host processor 21, and the storage controller 25 forwards at least some of these transaction commit commands over the link 22 to the storage controller 27.

Figure 2:
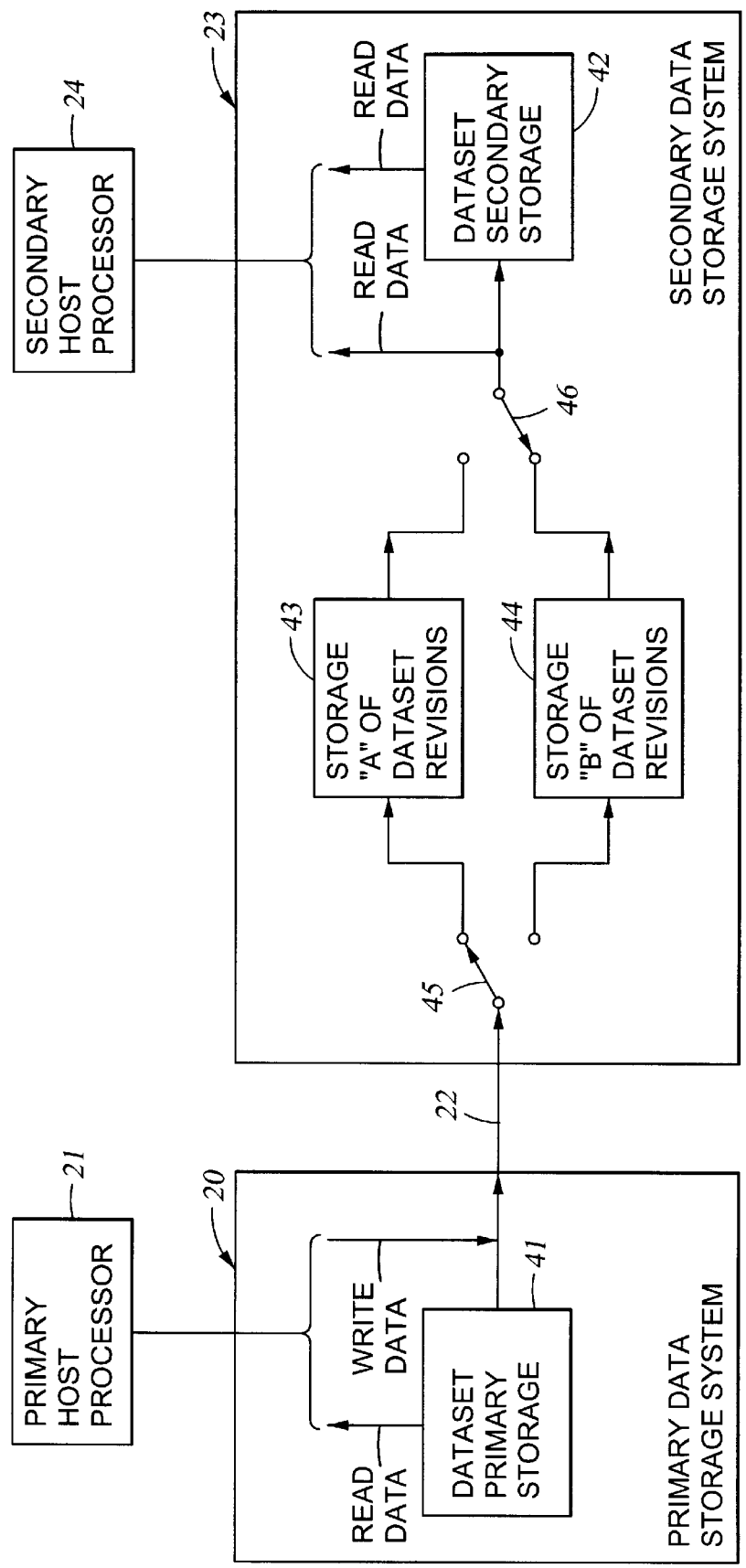
FIG. 2 is a block diagram showing data flow through the data processing system of FIG. 1.

FIG. 2 is a block diagram showing data flow through the data processing system of FIG. 1. The primary data storage system 20 stores a dataset 41 in primary storage, and the secondary data storage system 23 maintains a copy of the dataset 42 in secondary storage. The dataset, for example, could be a set of volumes, a single volume, a file system, a set of files, or a single file. Initially, each of the datasets 41 and 42 are empty, or they are identical because they are loaded from the same external source, or the dataset 42 is copied from the dataset 41 before any write operations are permitted upon the dataset 41. Subsequently, write operation by the primary host processor 21 cause write data to be written to the dataset 41 in primary storage, and read operations by the primary host processor 21 cause read data to be read from the dataset 41 in primary storage. In addition, the primary data storage system forwards the write data from the primary host processor 21 over the link 22 to the secondary data storage system 23. A first switch 45 directs write data from the link 22 alternately to either a first storage "A" of dataset revisions 43, or a second storage "B" of dataset revisions 44. A second switch 46 alternately directs write data to the dataset secondary storage 42 from either the first storage "A" of dataset revisions 43, or the second storage "B" of dataset revisions. The switches 45 and 46 are linked so that when the first switch 45 selects the first storage "A" of dataset revisions for receiving write data from the link 22, the second switch 46 selects the second storage "B" of dataset revisions for transmitting write data to the dataset secondary storage 42. Conversely, when the first switch 45 selects the second storage "A" of dataset revisions for receiving write data from the link 22, the second switch 46 selects the first storage "B" of dataset revisions for transmitting write data to the dataset secondary storage 42.

To provide the secondary host processor with uninterrupted read-only access to a consistent dataset, the switches 45 and 46 are toggled in response to receipt of a transaction commit command received over the link 22 from the primary data storage system. Moreover, the switches 45 and 46 are not toggled unless all of the revisions in the read-selected storage "A" or "B" of dataset revisions have been transferred to the dataset secondary storage 42, and unless all of the updates since the last transaction commit command have actually been written from the link 22 into the write-selected storage "A" or "B" of dataset revisions. (For the switch positions in FIG. 2, the storage "A" of dataset revisions 43 is write selected, and the storage "B" of dataset revisions is read-selected.) Therefore, the combination of the dataset revisions in the read-selected storage "A" or "B" of dataset revisions with the dataset in the dataset secondary storage represents a consistent dataset. Just after the switches 45 and 46 are toggled, the secondary data storage system begins a background process of reading dataset revisions from the read-selected storage "A" or "B" of dataset revisions, and writing the updates into the dataset secondary storage. Moreover, at any time the secondary host processor 24 may read any dataset revisions from the read-selected storage "A" or "B" of dataset revisions. If a dataset revision is not found in the read-selected storage "A" or "B" of dataset revisions for satisfying a read command from the secondary host processor 24, then read data is fetched from the dataset secondary storage 42.

One advantage to the present invention is that the concurrent access facility 31 can provide the secondary host processor with substantially uninterrupted and concurrent read-only access to a consistent dataset regardless of the rate at which the dataset secondary storage 42 is updated to a consistent state by the completion of integration of a set of revisions into the dataset secondary storage. Therefore, the dataset in the dataset secondary storage 42 can be updated at a relatively low rate, and the storage controller 25 of the primary data storage system 20 can send transaction commit commands to the storage controller 27 of the secondary data storage system 23 at a much lower rate than the rate at which the storage controller 25 receives transaction commit commands from the primary host processor 21. Moreover, the transaction commit commands can be encoded in the write commands sent over the link. For example, the write commands can write alternate sets of revisions to alternate dataset revision storage, as will be described below with respect to FIG. 9. In such a case, the storage controller 27 in the secondary data storage system 23 can regenerate the transaction commit commands by detecting that the addresses of the write commands have switched from one area of dataset revision storage to the other. Moreover, each write command can be tagged with a corresponding sequence number so that the storage controller 27 in the secondary data storage system 23 can verify that a complete set of write commands has been received prior to the switch of the write command addresses from one area of the dataset revision storage to the other.

Figure 3:
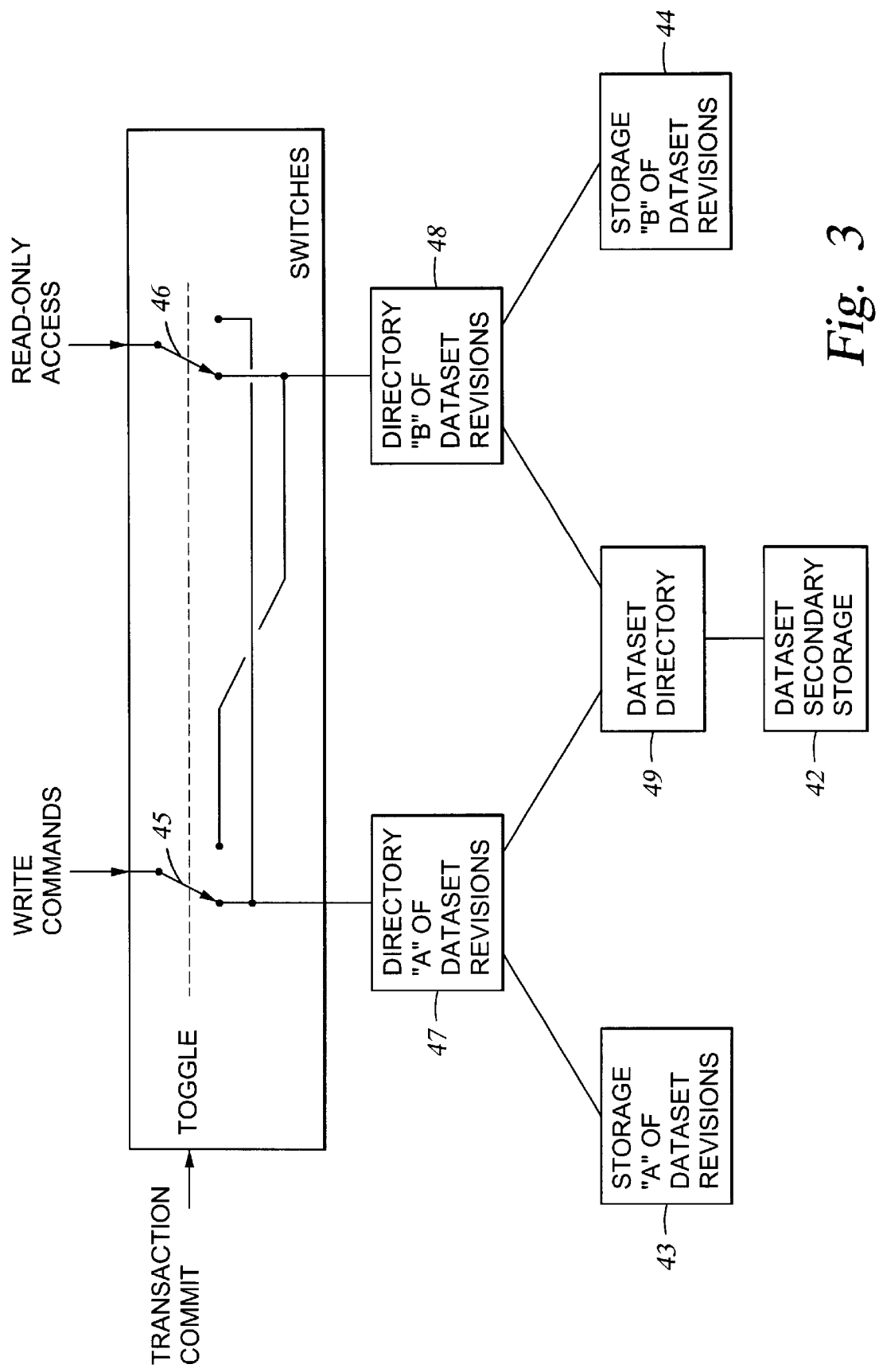
FIG. 3 is a block diagram showing control flow through the secondary data storage system of FIG. 1.

FIG. 3 is a block diagram showing control flow through the secondary data storage system of FIG. 1. Upon receipt of a write command (from the link 22 in FIGS. 1 and 2), the secondary data storage system accesses a directory 47 or 48 for the write-selected storage "A" or "B" of dataset revisions. The directory is accessed to determine whether or not the write command is accessing the same data item or data storage location as an update existing in the write-selected storage "A" or "B" of dataset revisions. If so, then the directory provides the location of the update in the write-selected storage "A" or "B" of dataset revisions, and the write command is executed upon that pre-existing update. If not, then storage is allocated in the write-selected storage "A" or "B" of dataset revisions for the update of the write command, the update of the write command is written into the allocated storage, and the directory 47 or 48 of the write-selected storage "A" or "B" of dataset revisions is updated to associate the allocated storage for the storage location or data item accessed by the write command.

Upon receipt of a read-only access command from the secondary host processor, the secondary data storage system accesses the directory 47 or 48 for the read-selected storage "A" or "B" of dataset revisions. The directory is accessed to determine whether or not the read-only access command is accessing the same data item or data storage location as an update existing in the read-selected storage "A" or "B" of dataset revisions. If so, then the directory provides the location of the update in the read-selected storage "A" or "B" of dataset revisions, and the read-only access command is executed upon that pre-existing update. If not, then the secondary data storage system accesses a dataset directory 49 for the dataset secondary storage 42, in order to locate the requested data in the dataset secondary storage 42.

Figure 4:
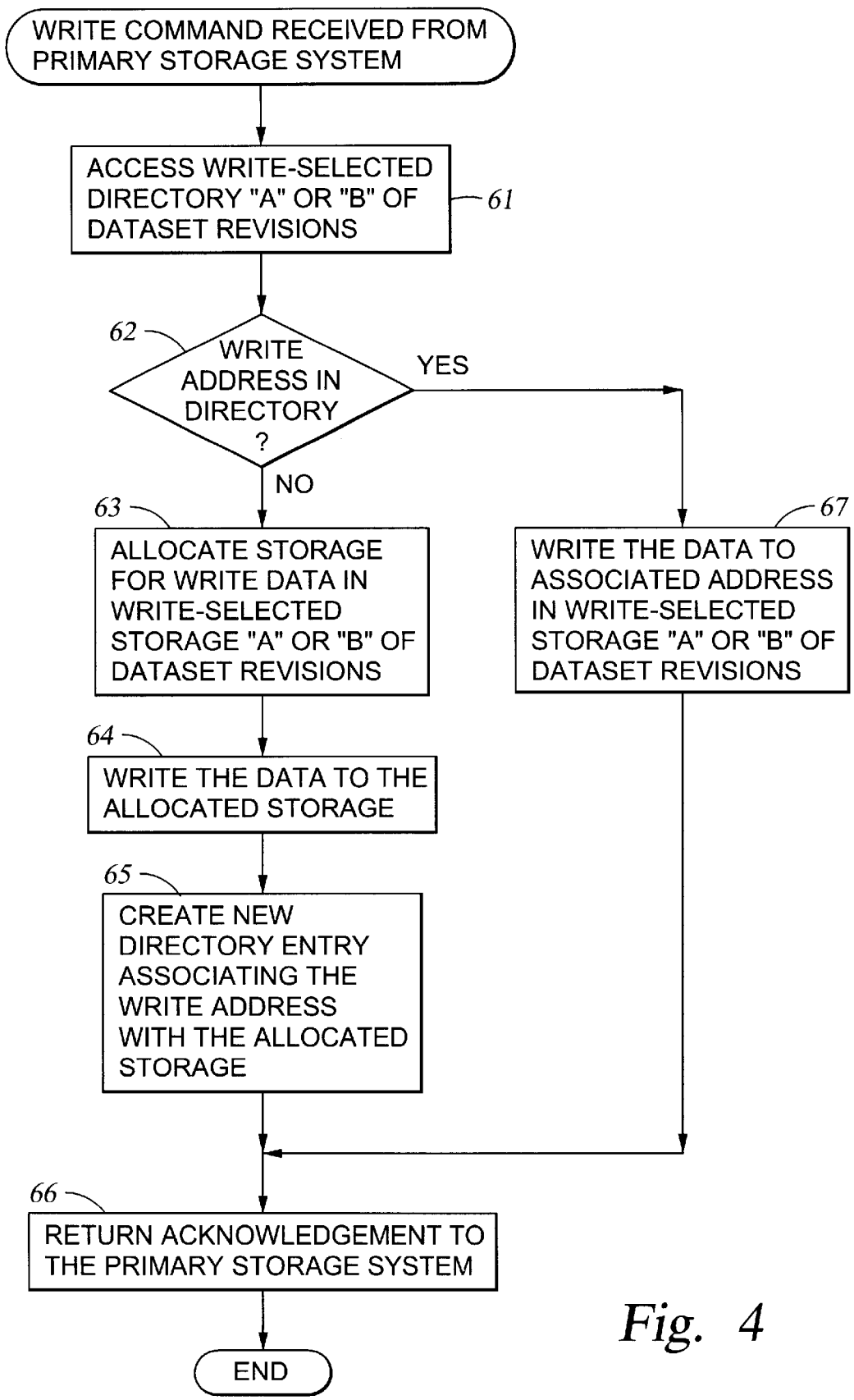
FIG. 4 is a flow chart showing how the secondary data storage system in FIG. 1 is programmed to respond to a write command received from the primary data storage system.

FIG. 4 is a flow chart showing how the secondary data storage system in FIG. 1 is programmed to respond to a write command received from the primary data storage system. The write command specifies an address of a data item or storage location, and data to be written to the data item or storage location. In the first step 61, the storage controller accesses the write-selected directory "A" or "B" of dataset revisions (47 or 48) for the address specified by the write command. Next, in step 62, execution branches depending on whether or not the address is in the directory. If not, then in step 63, the storage controller allocates storage for the write data in the write-selected storage "A" or "B" of dataset revisions (43 or 44). Then in step 64, the storage controller writes the data to the allocated storage. Then in step 65, the storage controller creates a new directory entry (in the write-selected directory "A" or "B" of dataset revisions 47 or 48) associating the write address with the allocated storage. Then in step 66, the storage controller returns an acknowledgement over the link to the primary storage system, and the task is finished.

In step 62, if the write address is in the directory, then execution branches to step 67. In step 67, the storage controller writes the data of the write command to the associated address in the write-selected storage "A" or "B" of dataset revisions (43 or 44). Execution continues from step 67 to step 66 to return an acknowledgement to the primary storage system, and the task is finished.

Figure 5:
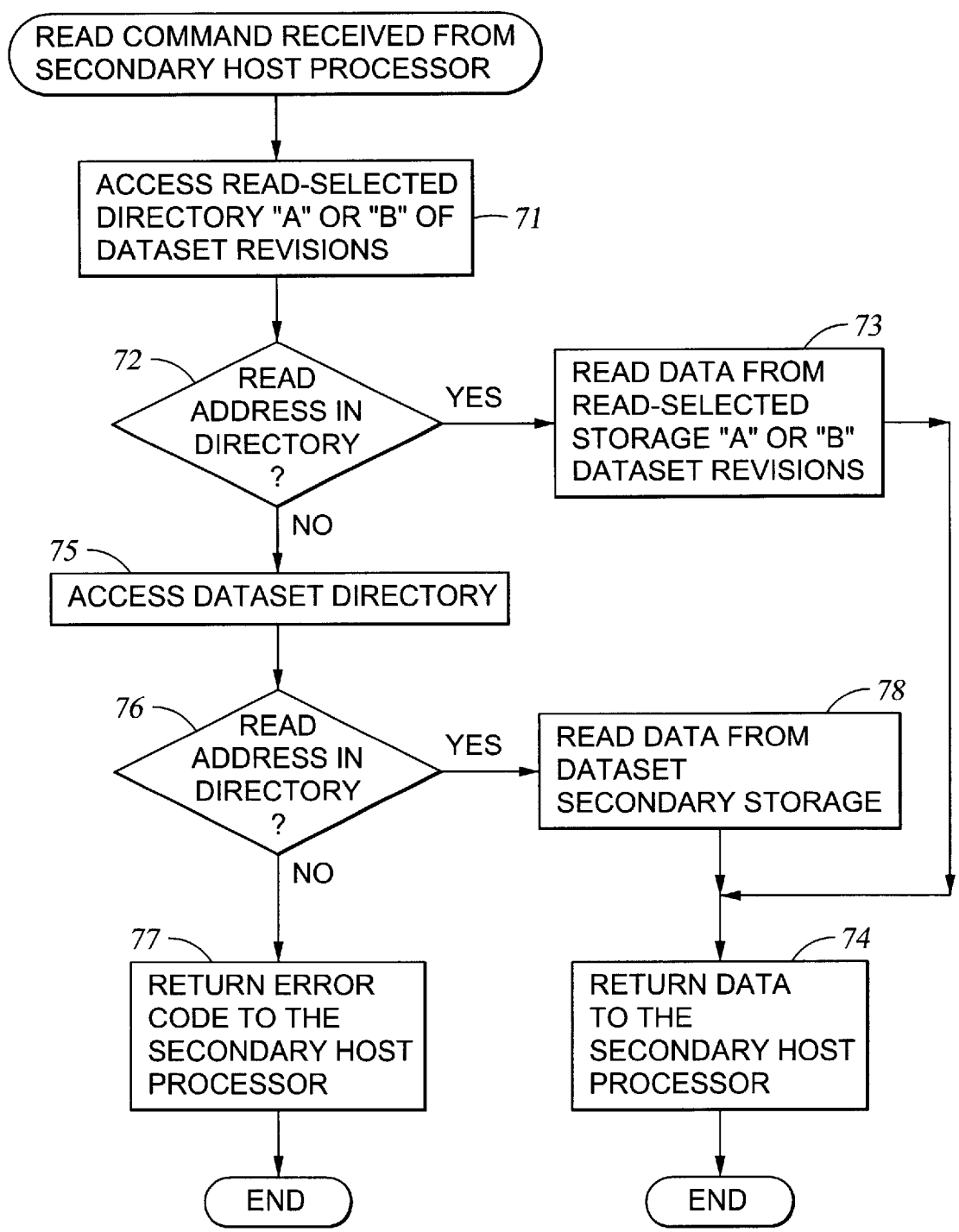
FIG. 5 is a flow chart showing how the secondary data storage system in FIG. 1 is programmed to respond to a read command received from the secondary host processor.

FIG. 5 is a flow chart showing how the storage controller of the secondary data storage system in FIG. 1 is programmed to respond to a read command received from the secondary host processor. The read command specifies an address of a data item or storage location. In a first step 71, the storage controller accesses the read-selected directory "A" or "B" of dataset revisions (47 or 48). Then in step 72, execution branches depending on whether the address in the read command is found in the directory. If so, then execution branches from step 72 to step 73. In step 73, the storage controller reads data from the read-selected storage "A" or "B" of dataset revisions. Execution continues from step 73 to step 74, to return the data to the secondary host processor, and then the task is finished.

If in step 72 the read address is not in the directory accessed in step 71, then execution continues from step 72 to step 75. In step 75, the storage controller accesses the dataset directory (48 in FIG. 3). Then in step 76, execution branches depending on whether the address of the read command is in the dataset directory. If not, execution continues to step 77, to return an error code to the secondary host processor, and then the task is finished. Otherwise, if the address of the read command is found in the dataset directory, execution branches from step 76 to step 78. In step 78, the storage controller reads data from the dataset secondary storage (42 in FIG. 3). Execution continues from step 78 to step 74, to return the data to the secondary host processor, and the task is finished.

Figure 6:
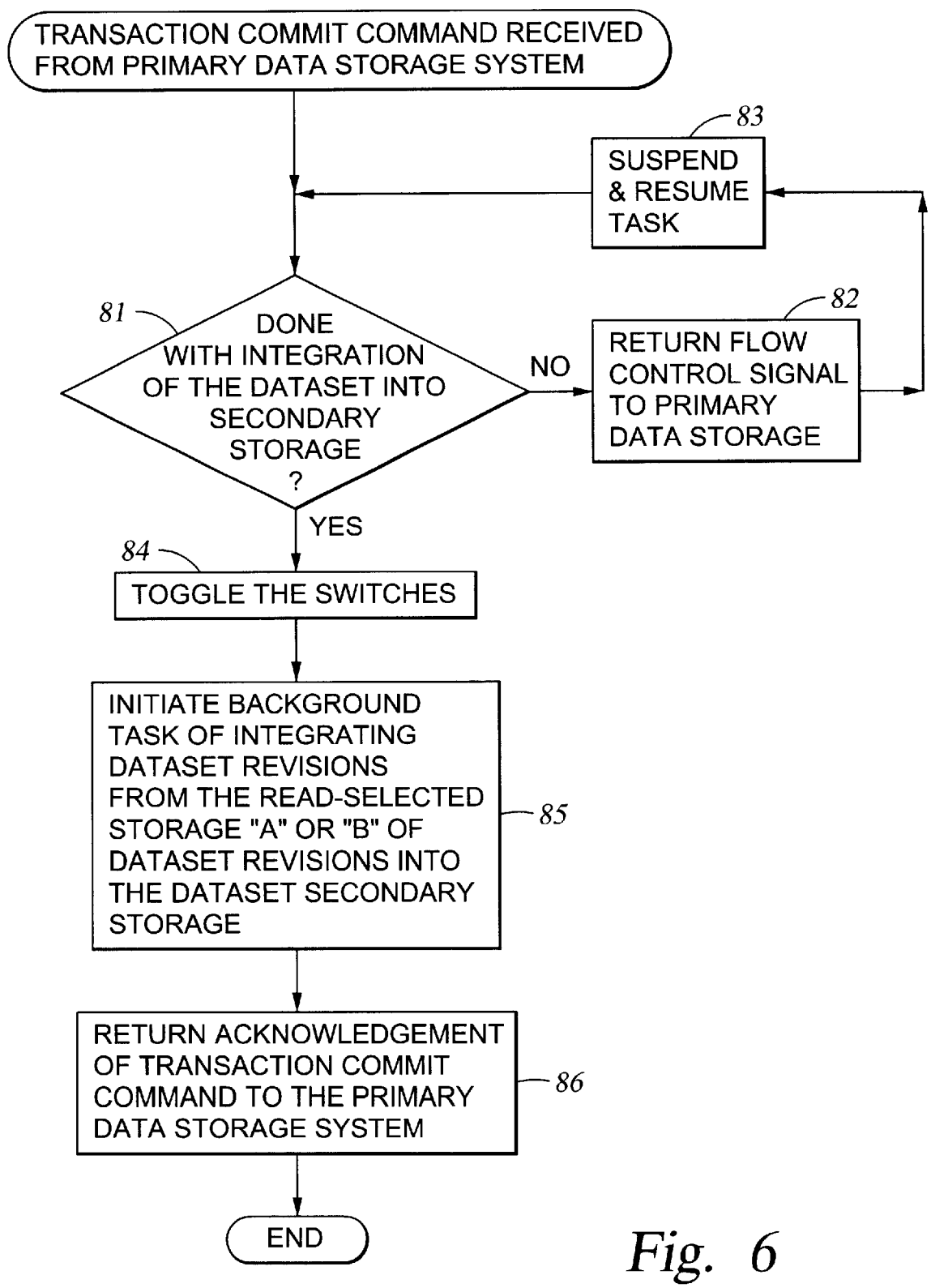
FIG. 6 is a flow chart showing how the secondary data storage system in FIG. 1 is programmed to respond to a transaction commit command from the primary data storage system.
Figure 7:
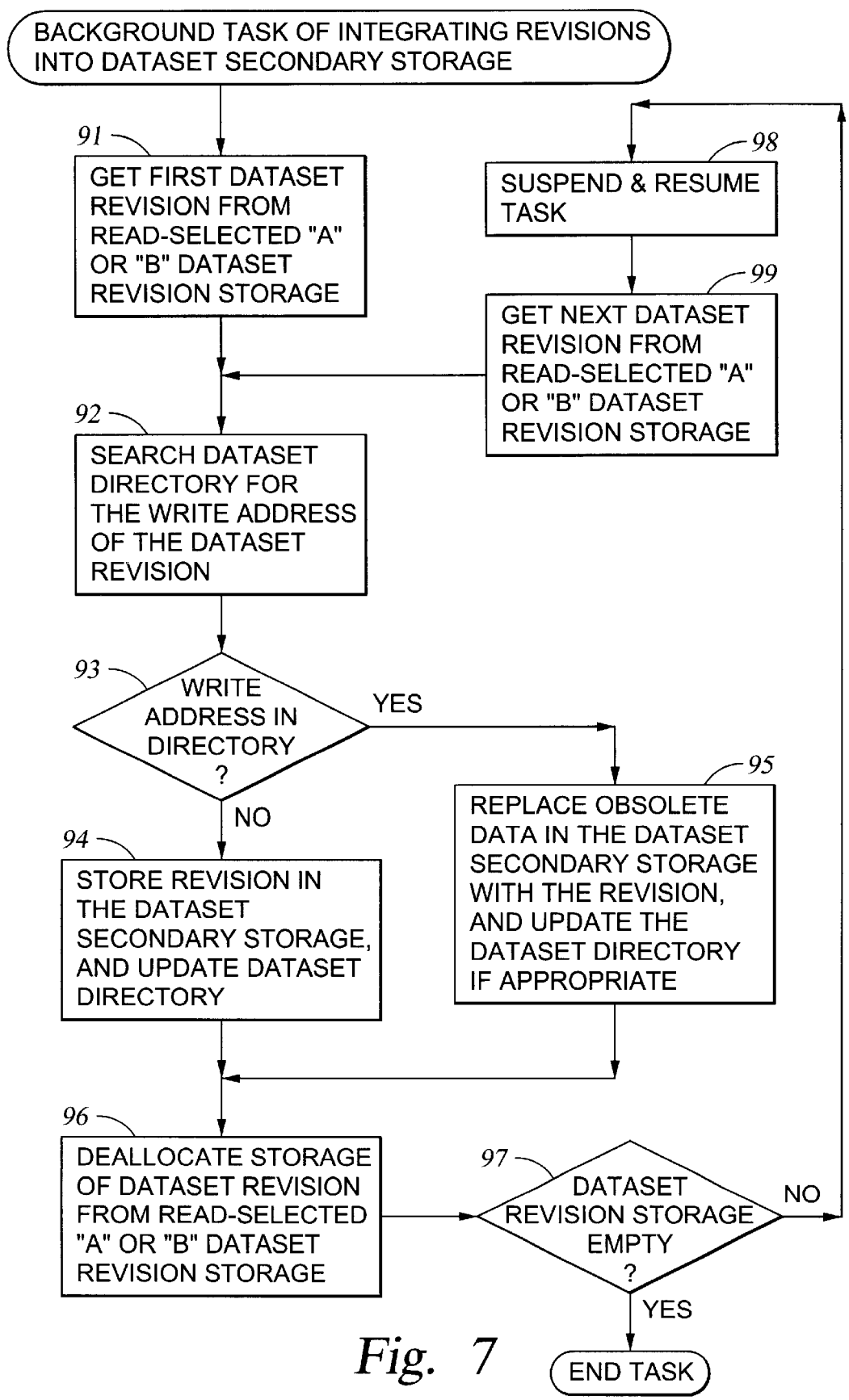
FIG. 7 is a flow chart showing how the secondary data storage system in FIG. 1 is programmed to perform a background task of integrating revisions into secondary dataset storage in the secondary data storage system.

FIG. 6 is a flowchart showing how the storage controller of the secondary data storage system in FIG. 1 is programmed to respond to a transaction commit command from the primary data storage system. In a first step 81, the storage controller checks whether or not the background task of FIG. 7 is done with integration of the dataset into the dataset secondary storage. For example, this background task is done when the read-selected directory "A" or "B" of dataset revisions is empty. If not, then in step 82, the storage controller returns a flow control signal to the primary data storage system, because subsequent write commands from the link should not be placed in the storage "A" or "B" of dataset revisions until completion of the integration of the dataset revisions into secondary storage. Any such subsequent write commands could be placed in a temporary buffer until completion of the integration of the dataset revisions into the secondary storage, and a preferred buffering technique will be described below with reference to FIGS. 8 to 11. Execution continues from step 82 to step 83. In step 83, the task of FIG. 6 is suspended for a time to permit the background task to continue with integration of the dataset into secondary storage, and then the task is resumed. After step 83, execution loops back to step 81. Once the dataset has been integrated into secondary storage, execution continues from step 81 to step 84.

In step 84, the switches (45 and 46 in FIGS. 2 and 3) are toggled. This is done by complementing a logical variable or flag, which indicates what storage of dataset revision is selected for read and write operations. For example, when the flag has a logical value of 0, the storage "A" of dataset revisions 43 is read-selected, and the storage "B" of dataset revisions 44 is write-selected. When the flag has a logical value of 1, the storage "A" of dataset revisions 43 is write-selected, and the storage "B" of dataset revisions is read-selected. Next, in step 85, the storage controller initiates the background task of integrating dataset revisions from the read-selected storage "A" or "B" of dataset revisions into the dataset secondary storage. Then, in step 86, the storage controller returns an acknowledgement of the transaction commit command to the primary data storage system, and the task of FIG. 6 is done.

FIG. 7 is a flow chart showing how the storage controller of the secondary data storage system in FIG. 1 is programmed to perform a background task of integrating revisions into the dataset secondary storage. In a first step 91, the first dataset revision is obtained from the read-selected "A" or "B" dataset revision storage (43 or 44 in FIG. 3). Next, in step 92, the storage controller searches the dataset directory (49 in FIG. 3) for the write address of the dataset revision. Then, in step 93, execution branches depending on whether the write address is found in the directory. If not, execution continues from step 93 to step 94. In step 94, the storage controller stores the revision in the dataset secondary storage (42 in FIG. 3), and the storage controller updates the dataset directory (49 in FIG. 3). Execution continues from step 94 to step 96.

In step 93, if the address of the dataset revision is found in the dataset directory, then execution branches to step 95 to replace the obsolete data in the dataset secondary storage with the dataset revision, and the dataset directory is updated if appropriate. The dataset directory is updated, for example, if the information in the directory for the obsolete data is no longer applicable to the revision. After step 95, execution continues in step 96.

In step 96, the storage controller de-allocates storage of the dataset revision from the read-selected "A" or "B" dataset revision storage (43 or 44 in FIG. 3). Execution continues from step 96 to step 97. In step 97, the task is finished if the dataset revision storage is found to be empty. Otherwise, execution continues from step 97 to step 98. In step 98, the task is suspended to permit any higher priority tasks to begin, and once the higher priority tasks are completed, the background task is resumed. Execution then continues to step 99. In step 99, the storage controller obtains the next dataset revision from the read-selected "A" or "B" dataset revision storage. Execution loops back to step 92 from step 99, in order to integrate all of the revisions from the read-selected "A" or "B" dataset revision storage into the dataset secondary storage.

Figure 8:
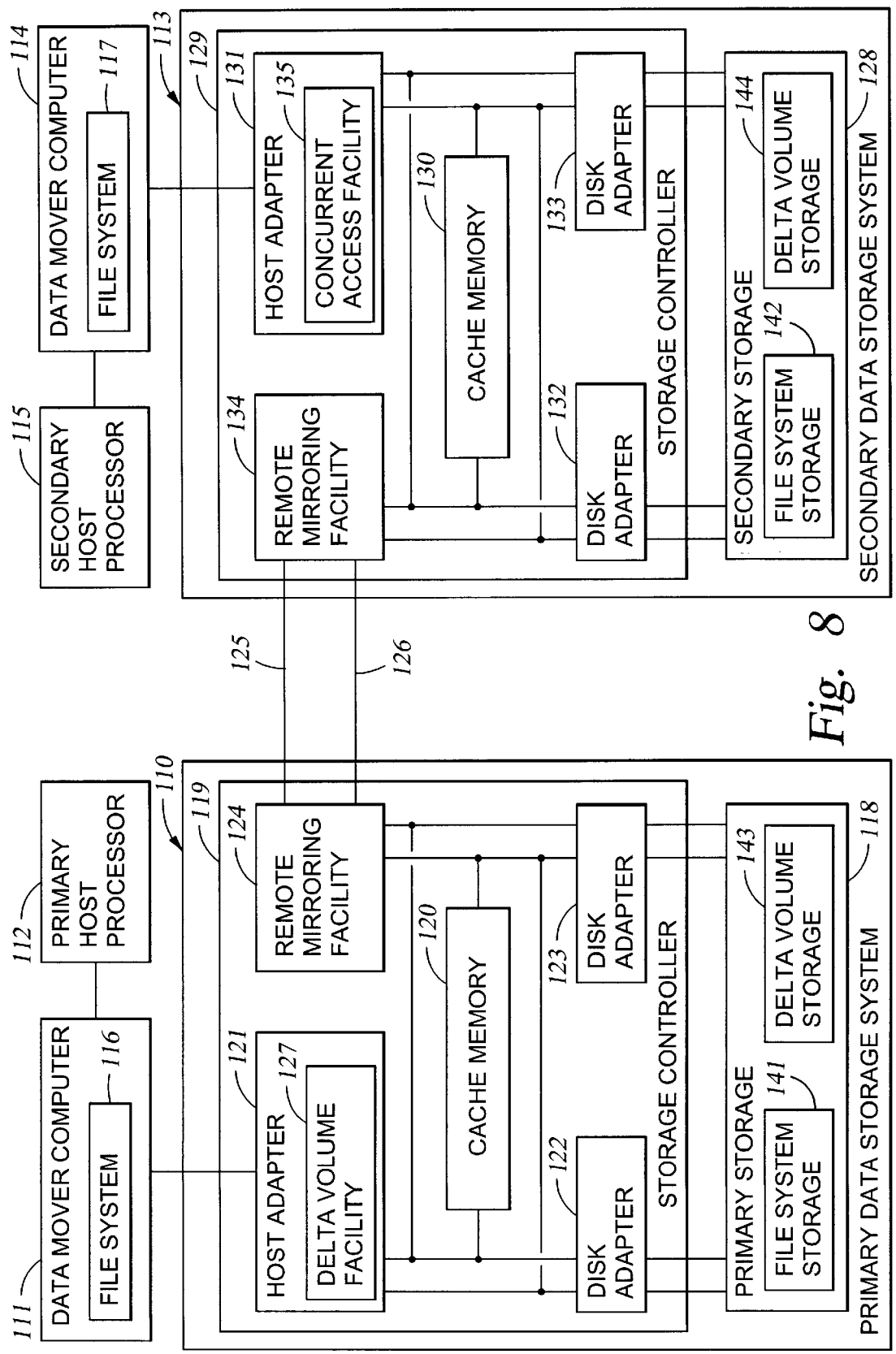
FIG. 8 is a block diagram of a preferred construction for the data processing system of FIG. 1, in which a pair of "delta volumes" are mirrored between a primary data storage system and a secondary data storage system in order to buffer transmission of write commands from the primary data storage system to the secondary data storage system.

The above description with respect to FIGS. 1 to 5 has not been limited to any particular form of dataset structure or directory structure. For example, the dataset revisions could operate upon direct mapped, numerically addressed storage, or they could operate upon dynamically allocated, symbolically addressed storage. For example, FIG. 8 is a block diagram of one preferred construction for a data processing system in which the write commands for the dataset revisions access direct mapped, numerically addressed storage. The data processing system includes a primary data storage system 110, a data mover computer 111, a primary host processor 112, a secondary data storage system 113, a data mover computer 114, and a secondary host processor 115. The data mover computer 111 includes a file system 116 that translates file system read and write commands from the primary host processor 112 to logical block read and write commands to the primary data storage system. Therefore, the combination of the data mover computer 111 and the primary data storage system 110 functions as a file server. Further details regarding the programming of the data mover computer 111 and the file system 116 are disclosed in Vahalia et al., U.S. Pat. No. 5,893,140, issued Apr. 6, 1999, and entitled "File Server Having A File System Cache And Protocol For Truly Safe Asynchronous Writes," incorporated herein by reference. In a similar fashion, the combination of the secondary data storage system 113 and the data mover computer 114 also functions as a file server.

The primary data storage system has primary storage 118, and a storage controller 119. The storage controller includes a semiconductor random access cache memory 120, a host adapter 121 interfacing the data mover computer 111 to the cache memory, disk adapters 122, 123 interfacing the cache memory to the primary storage 118, and a remote mirroring facility 124 for interfacing the cache memory 120 to dual redundant data transmission links 125, 126 interconnecting the primary data storage system 110 to the secondary data storage system 113. The remote mirroring facility is constructed and operates as described in the above-cited Ofek et al., U.S. Pat. No. 5,901,327 issued May 4, 1999. This remote mirroring facility mirrors file system storage 141 in the primary storage 118. However, the file system storage 141 is mirrored by mirroring delta volume storage 143 that is used to buffer the updates to file system storage 141 of the primary storage 118. The host adapter 121 is programmed with a "delta volume facility" 127 that loads the updates into the delta volume storage 143 of the primary storage 118. The remote mirroring facility transmits the updates over the dual redundant links 125, 126 to mirrored delta volume storage 144 in secondary storage 128 in the secondary data storage system 113, as further shown and described below with reference to FIGS. 9 to 12.

The delta volume facility 127 is located at a volume manager level in data processing system of FIG. 8. The volume manager level lies between the level of the files system 116 and the level of the primary storage 118. The file system 116 addresses logical blocks in logical volumes. In other words, each logical volume appears as an array of blocks having contiguous logical block numbers. The volume manager maps the logical block number into an appropriate basic storage volume and physical offset within the basic volume. In addition, the volume manager permits a number of the basic storage volumes to be combined in various ways to construct a single metavolume that can be used to build a file system. The file system views the metavolume as a single, contiguous array of blocks that is accessible by specifying a logical block number within this array.

The secondary data storage system 113 also includes a storage controller 129. The storage controller 129 includes a semiconductor cache memory 130, a host adapter 131, disk adapters 132 and 133, and a remote mirroring facility 134. The host adapter 131 is programmed with a concurrent access facility 135 that is similar to the concurrent access facility (31 in FIG. 1) described above with respect to FIGS. 1 to 7, except that the concurrent access facility 135 obtains updates from the mirrored delta volume storage 144 in the secondary storage 128 (as further described below with reference to FIGS. 9 to 11) instead of directly from the primary data storage system.

Figure 9:
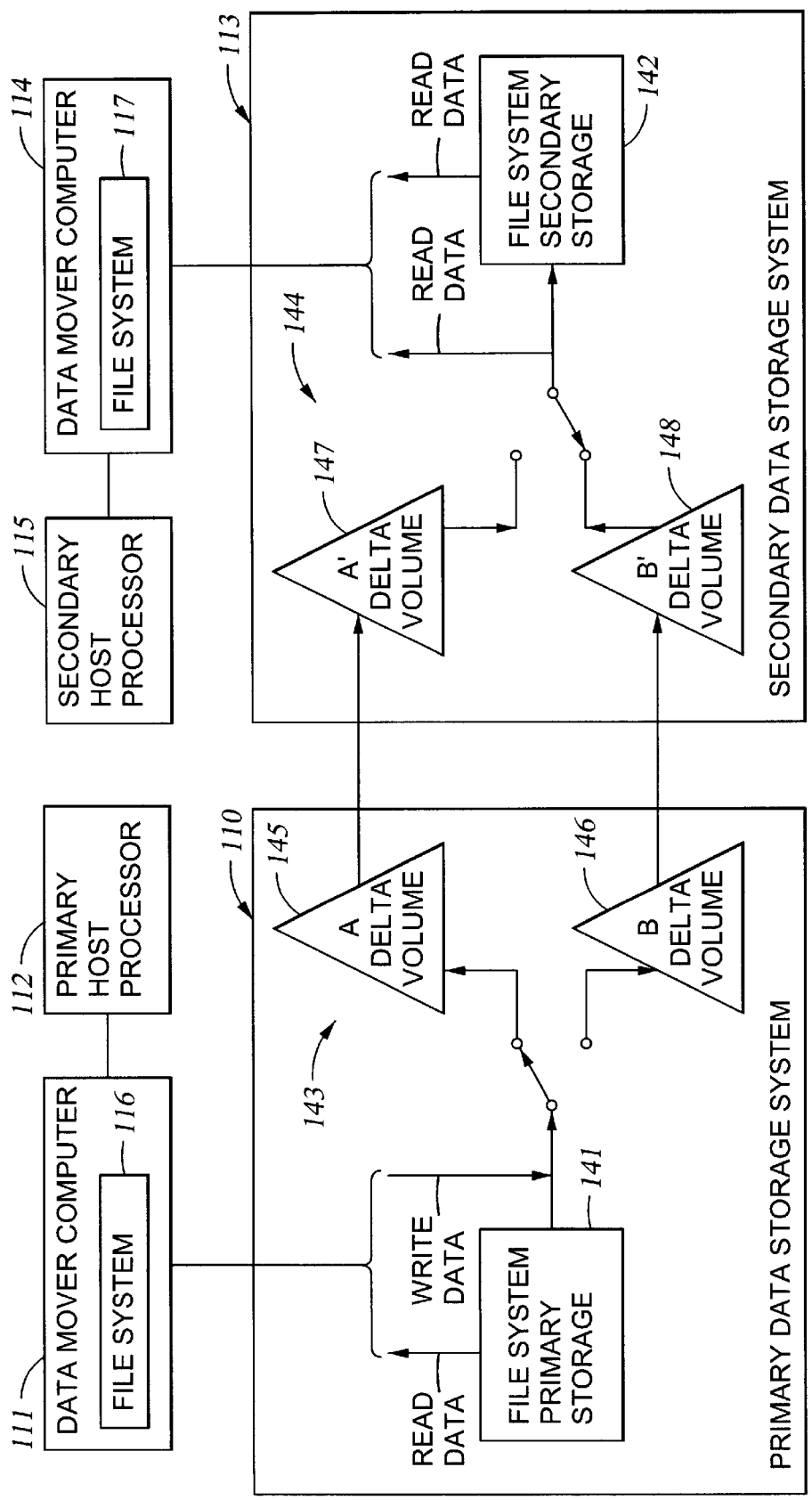
FIG. 9 is a block diagram showing data flow in the data processing system of FIG. 8.

FIG. 9 is a block diagram showing data flow in the data processing system of FIG. 8. When the primary host processor 112 requests file system access from the data mover computer 111, the file system 116 performs read and write operations upon the file system primary storage 141. Write data for sets of sequential transactions are alternately written to an "A" delta volume 145 and a "B" delta volume 146 in the delta volume storage 143 of the primary data storage system 110. The remote mirroring facility transfers the write data to a mirrored "A'" delta volume 147 and a mirrored "B'" delta volume 148 in the delta volume storage 144 of the secondary data storage system 113. When the secondary host processor requests read-only file system access from the data mover computer 114, the data mover computer reads file system data from a read-selected one of the "A'" delta volume 147 or the "B'" delta volume 148 in the delta volume storage 144 of the secondary data storage system 113, and if the required file system data are not found in the read-selected one of the delta volumes, then the data mover computer reads the file system data from the file system secondary storage 142.

Figure 10:
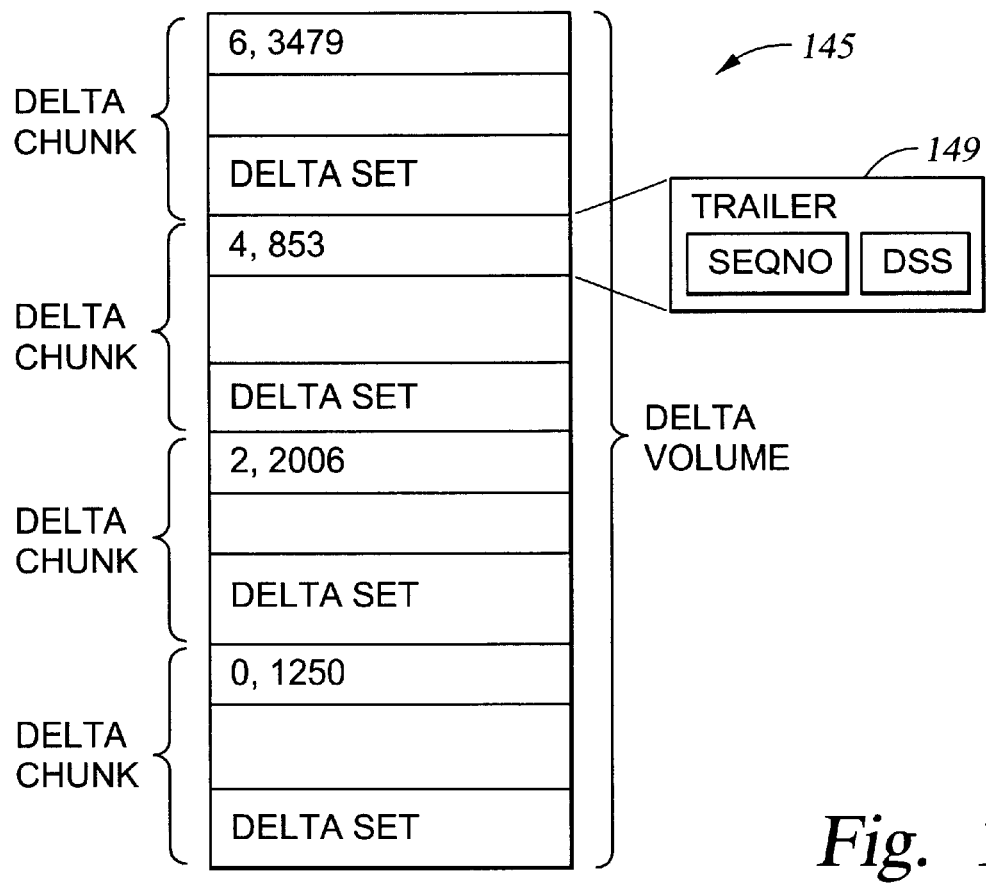
FIG. 10 is a block diagram of a delta volume in the data processing system of FIG. 8.

FIG. 10 is a block diagram of a delta volume in the data processing system of FIG. 8. Each delta volume is logically divided into delta chunks of a fixed size. The fixed size is preselected depending on various factors such as the serving capacity of the primary site and the write activity at the primary site. The fixed size is large enough to contain all of the updates for any single transaction. During initialization of the data processing system, file system access by the primary host processor is temporarily suspended and the file system primary storage 141 is copied to the file system secondary storage 142. Thereafter, file system access by the primary host processor is enabled, and the primary captures changes to the file system in delta sets. Each delta set is a set of changes to the file system blocks that, when viewed as a whole, leave the file system in a consistent state. The delta sets are identified by a sequence number (SEQNO) and written to the delta volume (and thus propagated to the replica sites). A new delta set begins at the start of a delta chunk and the size of a delta set cannot exceed the size of a delta chunk. The sequence number (SEQNO) and also the delta set size (DSS) can be written to a header or trailer 149 of the delta chunk. The delta volume therefore functions as a transaction log for updates to the file system, and also as a buffer for transmitting the updates between the primary data storage system and the secondary data storage system. In case of a system crash, the sequence numbers can be inspected to find the last valid delta volume. The block updates in each delta set can also have a fixed size, to facilitate asynchronous transmission of the updates over the data link between the primary and secondary data storage systems. In this case, each block update can have its own sequence number. If a transmission error is detected, such as a failure of the secondary data storage system to receive a block update in sequence, the block update can be retransmitted, and written into its delta set in proper sequence when received.

The specific format shown for the delta volume has been selected to minimize computational overhead for accessing the delta volume rather than to minimize storage requirements. In contrast, a conventional transaction log has a format selected to minimize storage requirements rather than to minimize computational overhead for accessing the log. Depending on the availability of computational resources in the primary data storage system and the secondary data storage system, the delta volume could use a conventional transaction log data structure. To reduce the computational overhead for accessing such a conventional transaction log, the delta volume could also include a delta set directory overlaid upon the conventional transaction log data structure.

It should also be apparent that a single delta volume, rather than two delta volumes, could be used for buffering the transmission of file system updates between the primary data storage system and the secondary data storage system. If a single delta volume were used, then alternate delta chunks in the delta volume could be read-selected and write-selected. It should also be apparent that more than two delta volumes could be used for buffering file system updates. For example, the primary data storage system could store data for multiple file systems, and each file system to be accessed from the secondary data storage system could have its updates buffered in one, two, or more delta volumes used for buffering the updates of only one file system.

Figure 11:
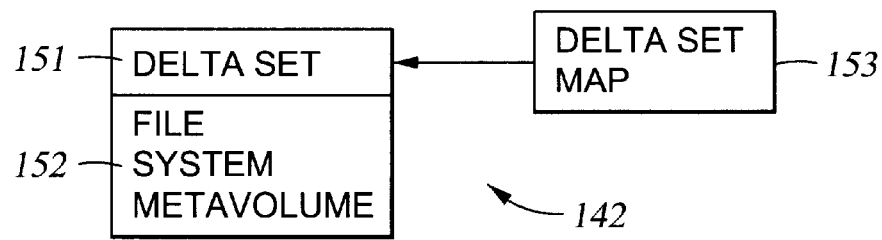
FIG. 11 is a block diagram of data structures in the secondary storage of the secondary data storage system in FIG. 8.

FIG. 11 is a block diagram of data structures in the file system secondary storage (128 in FIG. 8) of the secondary data storage system (113 in FIG. 8). The concurrent access facility (135 in FIG. 8) in the secondary data storage system uses a volume manager utility that inserts the read-selected delta set 151 as an overlay on top of the file system metavolume 152. At the time of insertion, a delta set map 153 is created of the block entries in the delta set 151. This map is then used to route a block read request to either the delta set or the file system metavolume depending on whether there is a block entry in the delta set for the requested block or not. Therefore, the read-selected delta set 151 corresponds to the read-selected storage "A" or "B" of dataset revisions 43 or 44 in FIG. 2 and FIG. 3, and the delta set map 153 corresponds to the directory 47 or 48 in FIG. 3 for the dataset revisions. The time of insertion of the read-selected delta set and the creation of the delta set map corresponds to the time between steps 84 and 85 of FIG. 6. In other words, after the read selection of the delta set and before initiation of the background task of integrating file system revisions from the read-selected delta set into the file system volume 143 in the secondary storage. The integration of the file system revisions involves copying the updates into the corresponding blocks of the file system metavolume 152. The routing of a block read request to either the delta set or the file system metavolume corresponds to steps 71 and 72 in FIG. 5.

Figure 12:
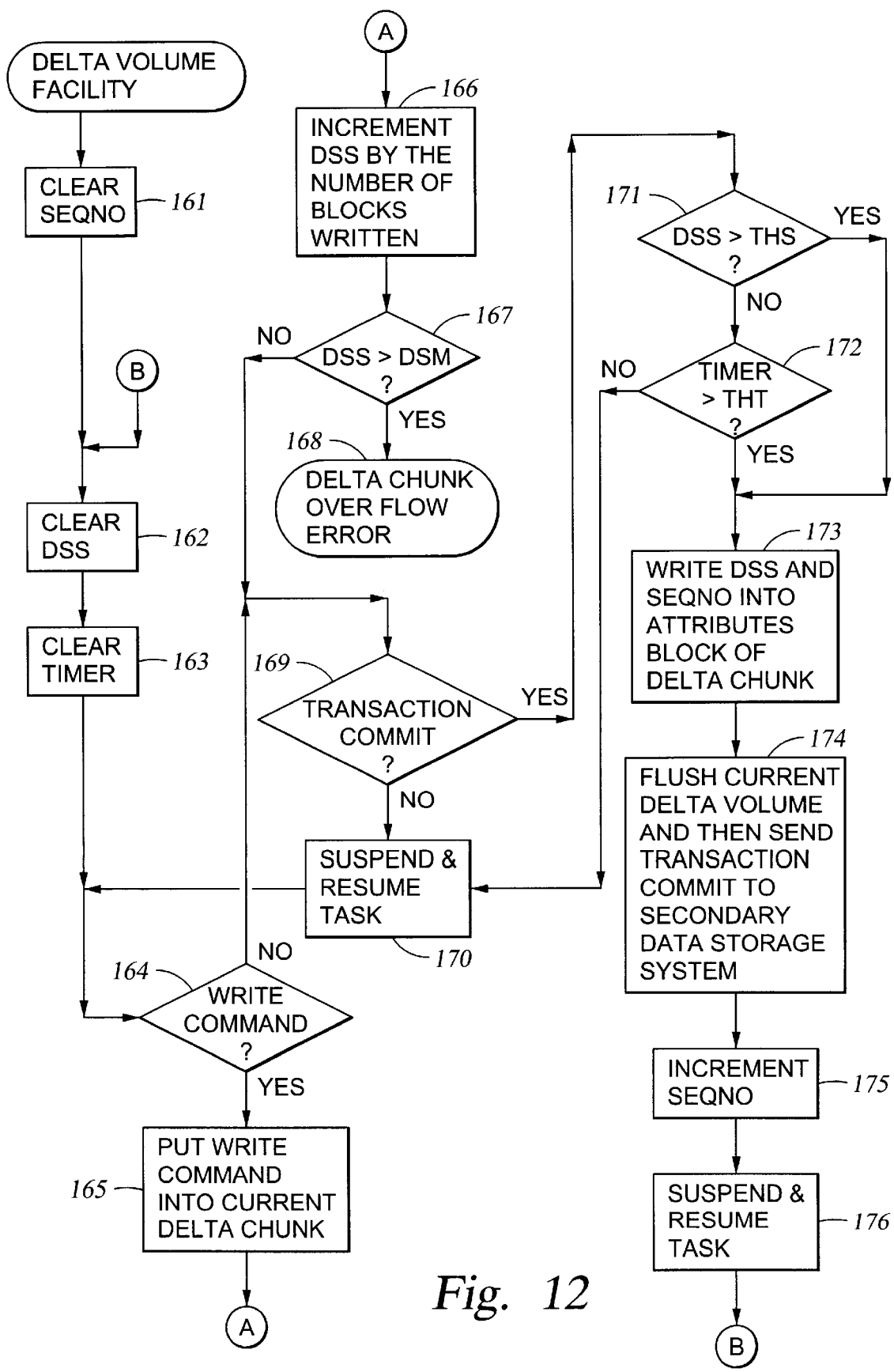
FIG. 12 is a flow chart of programming in a delta volume facility of the primary data storage system of FIG. 8 for remote transmission of write commands to the secondary data storage system.

FIG. 12 is a flowchart of programming in a delta volume facility of the primary data storage system of FIG. 8 for remote transmission of write commands to the secondary data storage system. In a first step 161, the storage controller of the primary data storage system clears the sequence number (SEQNO). The sequence number is used to map the current delta chunk into either the "A" delta volume or the "B" delta volume. For example, if the sequence number is even, then the current delta chunk is in the "A" delta volume, and if the sequence number is odd, then the current delta chunk is in the "B" delta volume. For the case of four delta chunks per delta volume, for example, the position of the delta chunk in the corresponding delta volume is computed by an integer division by two (i.e., a right shift by one bit position), and then masking off the two least significant bits (i.e., the remainder of an integer division by four).

Next, in step 162, the storage controller clears a variable indicating the delta set size (DSS). Then in step 163, the storage controller clears a timer. The timer is a variable that is periodically incremented. The timer is used to limit the frequency at which transaction commit commands are forwarded from the primary data storage system to the secondary storage system unless the transaction commit commands need to be transmitted at a higher rate to prevent the size of the delta sets from exceeding the size of the delta chunk.

In step 164, execution continues to step 165 if the storage controller receives a write command from the primary host processor. In step 165, the storage controller places the write command in the current delta chunk. This involves writing a number of data blocks to the delta volume selected by the sequence number (SEQNO), beginning at an offset computed from the sequence number and the current delta set size (DSS). Then in step 166, the storage controller increments the delta set size (DSS) by the number of blocks written to the delta chunk. In step 167, the storage controller compares the delta set size to a maximum size (DSM) to check whether a delta chunk overflow error has occurred. If so, then execution branches to an error handler 168. Otherwise, execution continues to step 169. In step 169, execution continues to step 170 unless a transaction commit command is received from the primary host processor. If not, execution continues to step 170, to temporarily suspend, and then resume, the delta volume facility task of FIG. 12. Otherwise, if a transaction commit command is received, execution continues to step 171. It should be noted that once step 171 has been reached, the data mover computer (111 in FIG. 8) has already flushed any and all file system updates preceding the transaction commit command from any of its local buffer storage to the primary data storage system. Write operations by the primary host processor subsequent to the transaction commit command are temporarily suspended until this flushing is finished. Therefore, once step 171 has been reached, the updates in the delta set of the current delta chunk represent a change of the file system from one consistent state to another consistent state.

In step 171, the storage controller compares the delta set size (DSS) to a threshold size (THS) that is a predetermined fraction (such as one-half) of the maximum size (DSM) for a delta chunk. If the delta set size (DSS) is not greater than this threshold, then execution continues to step 172. In step 172, the timer is compared to a predetermined threshold (THT) representing the minimum update interval for the file system secondary storage unless a smaller update interval is needed to prevent the size of the delta set from exceeding the size of the delta chunk. The minimum update interval (THT) should depend on the particular application. A value of 5 minutes for THT would be acceptable for many applications. If the timer is not greater than the threshold (THT), then execution loops back to step 170. Otherwise, execution continues to step 173. Execution also branches from step 171 to step 173 if the delta set size (DSS) is greater than the threshold size (THS).

In step 173, the storage controller writes the delta set size (DSS) and the sequence number (SEQNO) into an attributes block of the delta chunk (e.g., the trailer 199 in FIG. 10.) The updating of the sequence number in the delta chunk validates the delta set in the delta chunk. Then, step 174, the storage controller flushes the current delta volume to ensure that all updates in the delta set of the current delta chunk will be transmitted to the secondary data storage system, and then sends a transaction commit command to the secondary data storage system. The secondary data storage system should have received all of the updates in the delta set of the current delta chunk before receipt of the transaction commit command. For example, the remote data mirroring facility can be operated in an asynchronous or semi-synchronous mode for the current delta volume until step 174, and switched in step 174 to a synchronous mode to synchronize the current delta volume in the primary data storage system with its mirrored volume in the secondary data storage system, and then the transaction commit command can be sent once the remote mirroring facility indicates that synchronization has been achieved for the current delta volume. In step 175, the storage controller increments the sequence number (SEQNO). In step 176, the storage controller temporarily suspends the delta volume facility task of FIG. 12, and later resumes the task. Execution then loops back from step 176 to step 162.

By using delta volumes as buffers for transmission of updates from the primary data storage system to the secondary data storage system, there is no need for the delta volume facility to wait for receipt of an acknowledgement of the transaction commit command sent in step 174, before continuing to step 175. Instead, flow control of the updates can be based upon the sequence numbers and the use of sufficiently large delta volumes. Starting at initialization, the delta sets are numbered in an increasing sequence. At each site (primary and one or more secondaries), the delta sets are loaded and unloaded in the order of this sequence. If any delta sets are corrupted during transmission between the sites, they can be retransmitted and then reordered in terms of their sequence numbers. Thus, the primary data storage system will start by producing set number 1, followed by set number 2 and so on. Similarly, each secondary data storage system will integrate the file system secondary storage with the delta sets by unloading and integrating set number 1, followed by set number 2 and so on. The primary does not wait for an immediate acknowledgement from the secondaries when moving from one delta set to the next. This is made feasible by having a sufficiently large delta volume so that there is enough buffer space to allow the secondaries to be a few delta sets behind the primary without having an overflow. An overflow happens when a primary reuses a delta chunk to write a new delta set before one or more of the secondaries have completely processed the old delta set residing on that delta chunk. The primary data storage system can prevent such an overflow condition by suspending the processing of delta sets if there is a failure to receive an acknowledgement of a transaction commit command over the production of a certain number of the delta sets, such as seven delta sets for the example of four delta per delta volume and two delta volumes per file system. The overflow condition can also be detected at a secondary data storage system by inspecting the delta set sequence numbers. An overflow is detected if the SEQNO in the delta chunk exceeds the next number in sequence when the secondary data storage system read-selects the next delta chunk for integration of the updates into the file system secondary storage. When the secondary data storage system detects such an overflow condition, a flow control error recovery procedure is activated. This error recovery procedure, for example, involves suspending write operations by the primary host processor, re-synchronizing the file system secondary storage with the file system primary storage, and restarting the delta volume facility.

By using two delta volumes per file system instead of one, it is easy to use the conventional remote mirroring facility (124 in FIG. 8) in such a way to ensure that all of the updates to the delta set in the current delta chunk will be flushed and received by the secondary data storage system, prior to sending the transaction commit to secondary storage, with a minimal impact on continued host processing in the primary data storage system. Normally, the remote mirroring facility operates to transmit updates from the primary data storage system to the secondary data storage system concurrently with writing to the volume. During the flushing and synchronization of a remotely mirrored volume, however, the writing to a volume is temporarily suspended. By using two delta volumes, one of the delta volumes can be flushed in step 174 while the subsequent processing in FIG. 12 (steps 175, 176 et seq.) continues concurrently for the next delta set, which is mapped to the other of the two delta volumes.

An approach similar to the mirroring of delta volumes can be used for signaling between the primary data storage system and the secondary data storage system. A transmit message volume can be allocated in the primary and mirrored to a similar receive message volume in the secondary data storage system. Also a transmit message volume can be allocated in the secondary data storage system and mirrored to a similar receive message volume in the secondary. The remote mirroring facility will then automatically copy messages deposited in the transmit volume of one data storage system to a receive volume of another data storage system. The volumes can be partitioned into a number of identical message regions (analogous to the delta chunks of FIG. 10), each having an associated sequence number, so that the message volumes also function as a message queue. Each data storage system could inspect the sequence numbers in the receive message volume to identify a new message that has been deposited in the message volume. Each block in each message region could be allocated to a predefined message type.

Figure 13:
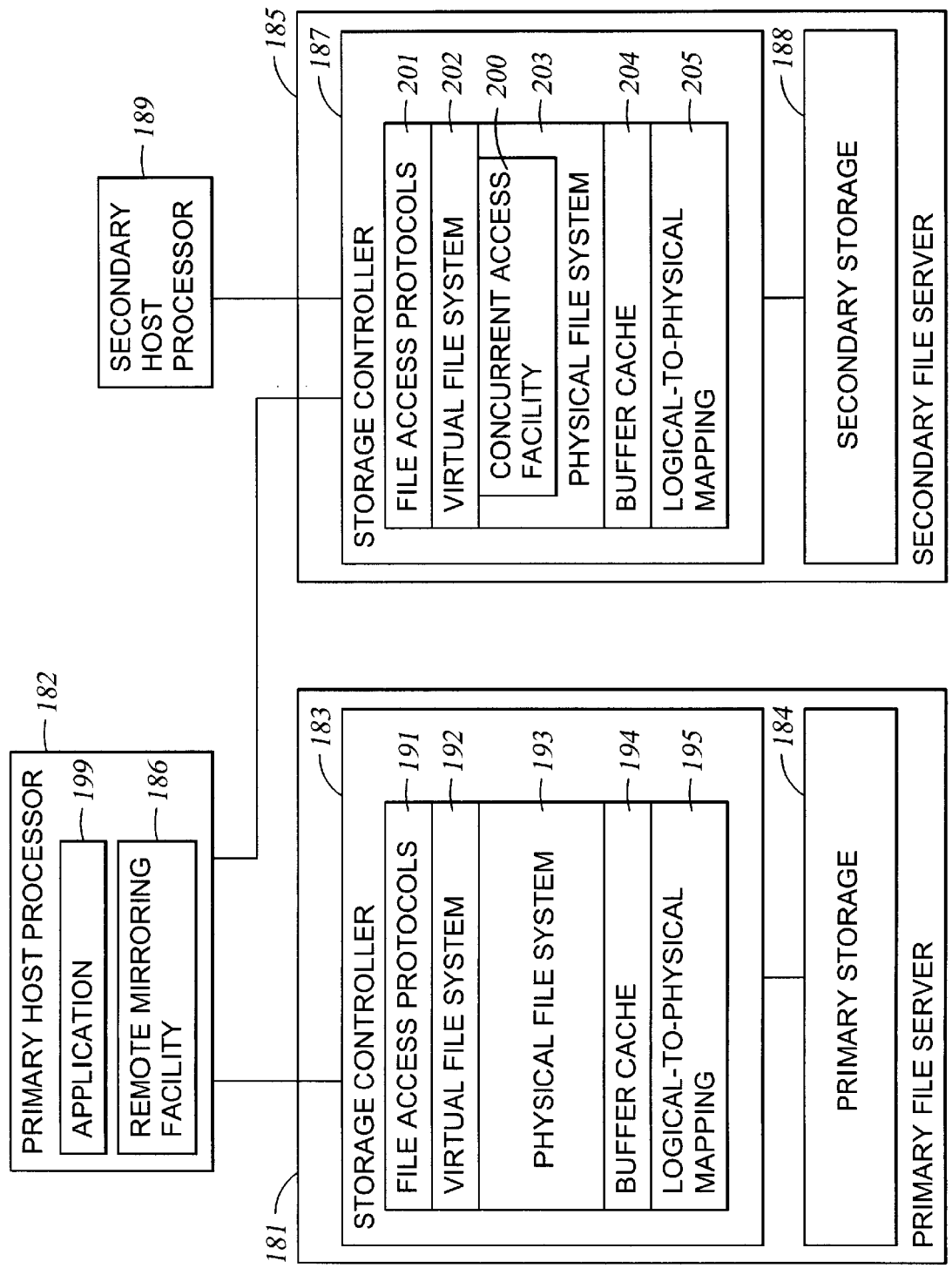
FIG. 13 is a block diagram of an alternative embodiment of the invention, in which the data storage systems are file servers, and the write commands include all file system access commands that modify the organization or content of a file system.

FIG. 13 is a block diagram of an alternative embodiment of the invention, in which the data storage systems are file servers, and the write commands include all file system access commands that modify the organization or content of a file system. The data processing system in FIG. 13 includes a conventional primary file server coupled to a primary host processor 182 for read-write access of the primary host processor to a file system stored in the file server. The conventional file server includes a storage controller 183 and primary storage 184. The storage controller 183 includes facilities for file access protocols 191, a virtual file system 192, a physical file system 193, a buffer cache 194, and logical-to-physical mapping 195. Further details regarding such a conventional file server are found in the above-cited Vahalia et al., U.S. Pat. No. 5,893,140, issued Apr. 6, 1999.

The data processing system in FIG. 13 also includes a secondary file server 185 coupled to the primary host processor 182 to receive copies of at least the write access commands sent from primary host processor to the primary file server. The secondary file server has a storage controller 187 and secondary storage 188. The storage controller 187 includes facilities for file access protocols 201, a virtual file system 202, a physical file system 203, a buffer cache 204, and logical-to-physical mapping 205. To this extent the secondary file server is similar to the primary file server.

In the data processing system of FIG. 13, the primary host processor 182 has a remote mirroring facility 186 for ensuring that all such write access commands are copied to the secondary file server 185. (This remote mirroring facility 186 could be located in the primary file server 181 instead of in the primary host processor.) The remote mirroring facility 186 also ensures that the primary host processor will receive acknowledgement of completion of all preceding write commands from an application 199 from both the primary file server 181 and the secondary file server 185 before the primary host processor will return to the application an acknowledgement of completion of a transaction commit command from the application 199. (This is known in the remote mirroring art as a synchronous mode of operation, and alternatively the remote mirroring facility 186 could operate in an asynchronous mode or a semi-synchronous mode.) The secondary file server 185 therefore stores a copy of the file system that is stored in the primary file server 181. Moreover, a secondary host processor 189 is coupled to the secondary file server 185 for read-only access of the secondary host processor to the copy of the file system that is stored in the secondary storage.

To provide the secondary host processor 189 with uninterrupted read-only access to a consistent version of the file system concurrent with read-write access by the primary host processor, the secondary file server 185 has a concurrent access facility 200 that is an interface between the virtual file system 202 and the physical file system 203. The physical file system layer 203, for example, is a UNIX-based file system having a hierarchical file system structure including directories and files, and each directory and file has an "inode" containing metadata of the directory or file. Popular UNIX-based file systems are the UNIX file system (ufs), which is a version of Berkeley Fast File System (FFS) integrated with a vnode/vfs structure, and the System V file system (s5fs). The implementation of the ufs and s5fs file systems is described in Chapter 9, pp. 261–289, of Uresh Vahalia, Unix Internals: The New Frontiers, 1996, Prentice Hall, Inc., Simon & Schuster, Upper Valley River, N.J. 07458.

The concurrent access facility 200 in FIG. 13 can be constructed as shown in FIGS. 2 to 7 above. In this case, the dataset is the file system. In addition, it is preferable for the directories of dataset revisions (47, 48 in FIG. 3) and the storage of data revisions (43, 44) to have a hierarchical inode structure to facilitate integration with the hierarchical inode structure of the UNIX-based file system directory corresponding to the dataset directory 49 in FIG. 3. In order to provide uninterrupted read-only access to all possible file system revisions, however, the hierarchical structure of the directories of dataset revisions, and the integration of the revisions with the UNIX-based file system directory, must consider some special types of file system modifications, such as file or directory deletions, and file or directory name changes.

Figure 14:
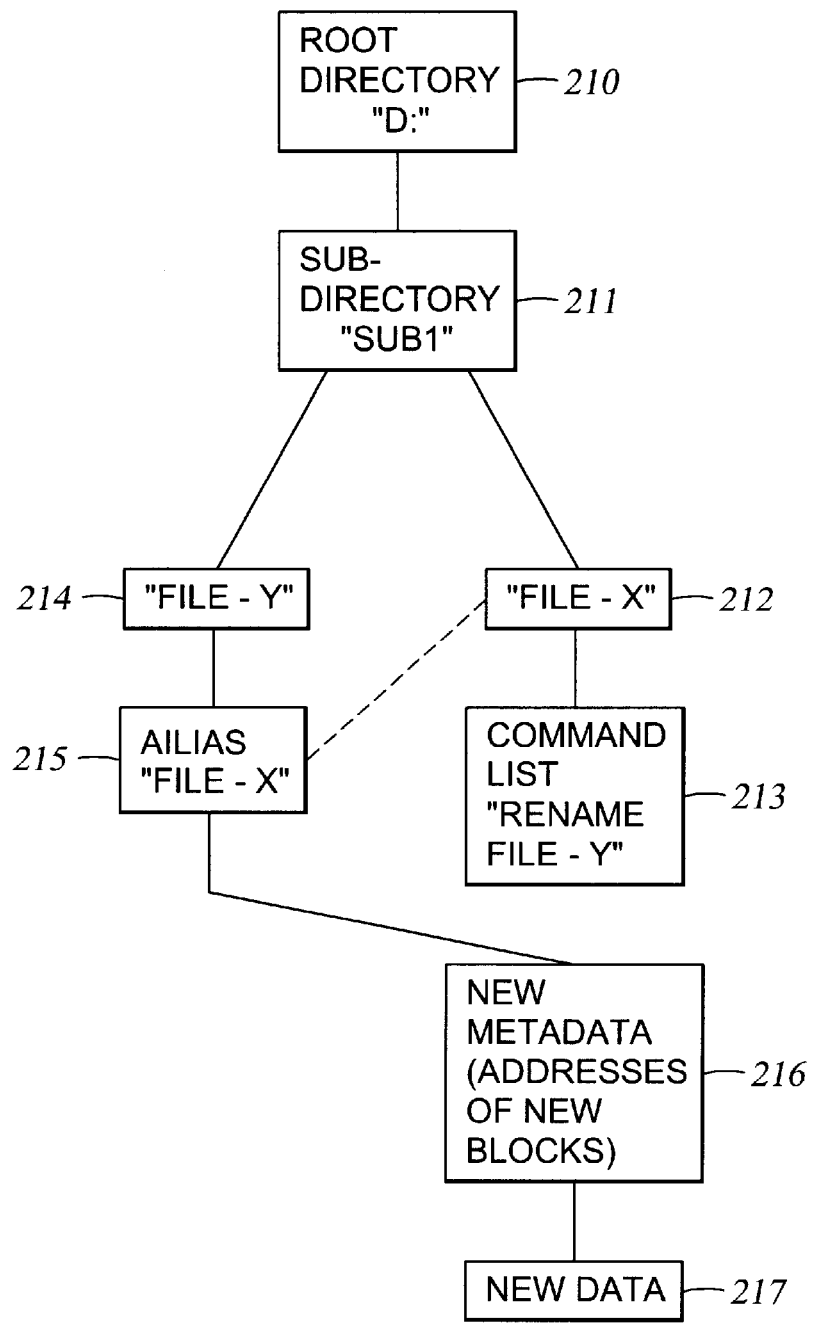
FIG. 14 is a block diagram of a directory of file system revisions and storage of file system revisions for the system of FIG. 13.

FIG. 14 shows a hierarchical structure of a directory of dataset revisions and storage of dataset revisions for a write to a file D:/SUB1/FILE-Y followed by a file rename operation RENAME D:/SUB1/FILE-X to D:/SUB1/FILE-Y. Assuming that these are the first two updates received by the secondary file server (185 in FIG. 13), the first update would be processed in steps 61 to 66 of FIG. 4 by creating a root directory 210 named "D:" in the write-selected directory of dataset revisions, as shown in FIG. 14, and then creating a subdirectory 211 named "SUB1", and then creating a file entry 210 named "FILE-X" in the subdirectory, and then creating a new metadata entry 216 linked to the file entry and including is a directory of the blocks of the new file data 217. The second update would be recognized and processed by the task of FIG. 4 as a special case. The task would process the second update by searching the root directory 210 and subdirectory 211 to find the "FILE-X" entry, and creating a new file entry 214 named "FILE-Y" in the subdirectory, and then linking an alias attribute pointing to the "FILE-X" entry in the subdirectory, and then creating a command list linked to the "FILE-X" entry and including the command "RENAME [FILE-X to] FILE-Y", and then unlinking the new metadata 216 and new data 217 from the "FILE-X" entry and linking the new metadata 216 and new data 217 to the "FILE-Y" entry. The resulting data structure would then facilitate subsequent read-only access and integration of the new data of "FILE-Y" with any non-obsolete write data for "FILE-X" in the dataset secondary storage (42 in FIG. 3) for the file system "D:/".

It should be apparent that the remote mirroring aspect of the present invention could be implemented at an intermediate level in the file server below the file access command level (as in the system of FIG. 13) and above the logical block level (as in the system of FIG. 8). For example, the remote mirroring could operate at the physical file system inode level. In this case, the storage of dataset revisions could be implemented as a sequential transactional log of the file system modifications on the primary side, with sufficient information stored in the log, such as inode numbers and old values and new values, to allow the secondary concurrent access facility to "replay" the transactions into the "live" file system in the file system secondary storage.

In view of the above, there have been disclosed a number of data processing systems that provide uninterrupted read-only access to a consistent dataset by one host processor concurrent with read-write access by another host processor. In each of these systems, there are sets of revisions to a dataset, such that each set of revisions changes the dataset from one consistent state to another. Each set of revisions is processed in a write-selected phase followed by a read-selected phase. In the write-selected phase, the revisions in each set are written to a buffer and processed to produce a directory of the set of revisions. In the read-selected phase, the revisions are read from the buffer and integrated into the dataset. When one set of revisions is in the read-selected phase, the next set of revisions is in the write-selected phase. To permit uninterrupted read-only access to a consistent state of the dataset, a request for reading specified data is processed on a priority basis by first accessing the directory of the read-selected revisions to determine whether the specified data are in the read-selected set of revisions, and if so, the specified data are read from the read-selected set of revisions, and if not, the specified data are read from the dataset. In a preferred implementation, the sets of revisions are alternately written to either a first buffer or a second buffer, and processing of each set of revisions is switched from the write-selected phase to the read-selected phase by switching between the two buffers.

It should be apparent that the described embodiments can be modified in various ways without departing from the scope of the invention as defined by the appended claims. Although the drawing figures show data processing systems with a single primary host processor and a single secondary host processor, it should be apparent that each data storage system could be directly linked to multiple host processors, and updates made to the primary storage in one primary data storage system could be transmitted to multiple secondary data storage systems at various locations. In addition, the terms "primary" and "secondary" indicate relationships of a host processor or data storage system to a particular dataset. A data storage system may store multiple datasets, and be "primary" with respect some of the datasets, and be "secondary" with respect to the other datasets. The host processors may take various forms, such as mainframe computers with dedicated links to one or more data storage systems, or clients such as personal computers or workstations linked by a data network to one or more data storage systems. The host processors and data storage systems may communicate with each other using various protocols and data transmission technologies, such as Ethernet, Fibre Channel, Small Computer Storage Interface (SCSI), Network File System (NFS), Common Internet File System (CIFS), and Asynchronous Transfer Mode (ATM) protocols.

The data storage systems may be linked in various ways to transmit dataset revisions from the primary data storage system to one or more secondary data storage systems. For example, instead of using the programmed processors 124 and 134 of FIG. 8 for linking the primary data storage system 110 and the secondary data storage system 113, each of the programmed processors could be replaced by an additional data mover computer for buffering and transmitting or receiving the data set revisions between the primary data storage system and the secondary data storage system. These two additional data mover computers could perform the function of remote mirroring of the delta set volumes, and each of the additional data mover computers could have its own local storage for storing the delta set volumes.

What is claimed is:

1. A method of operating a data storage system to provide uninterrupted read access to a consistent dataset concurrent with performing a series of revisions upon the dataset, the series of revisions including a first set of revisions followed by a second set of revisions, the dataset being in a consistent state after performing each set of revisions upon the dataset, said method comprising:

a) processing the first set of revisions to build up a directory of the first set of revisions; and then
   b) processing the second set of revisions to build up a directory of the second set of revisions, and concurrently performing the first set of revisions upon the dataset, and concurrently performing read access to specified data in the dataset by accessing the directory of the first set of revisions to determine whether the specified data are in the first set of revisions, and upon finding that the specified data are in the first set of revisions, obtaining the specified data from the first set of revisions, and upon finding that the specified data are not in the first set of revisions, obtaining the specified data from the dataset.

2. The method as claimed in claim 1, wherein the performing of the first set of revisions upon the dataset is suspended to give priority to the read access to the dataset.

3. The method as claimed in claim 1, which further includes, upon completion of the performance of the first set of revision upon the dataset, performing the second set of revisions upon the dataset, and concurrently processing read access to the dataset.

4. The method as claimed in claim 3, wherein the first set of revisions are stored in a first buffer, and the second set of revisions are stored in a second buffer, and wherein the method includes storing a third set of revisions in the first buffer, and upon completion of the performance of the first set of revisions upon the dataset, processing the third set of revisions to build up a directory of the third set of revisions.

5. The method as claimed in claim 1, wherein the revisions are data to be written to blocks of storage, and the directory of the first set of revisions is an index of addresses of blocks of storage to be written to for the first set of revisions, and the directory of the second set of revisions is an index of addresses of blocks of storage to be written to for the second set of revisions.

6. The method as claimed in claim 1, wherein the dataset is a file system, and at least one of the revisions is a change of a file name.

7. The method as claimed in claim 1, which includes selecting a number of revisions to be included in each set of revisions in order to obtain a limited frequency of updating of the dataset.

8. The method as claimed in claim 7, which includes buffering the first set of revisions and the second set of revisions, and permitting the frequency of updating of the dataset to exceed the limited frequency when required to avoid buffer overflow.

9. A method of read-write access by a first host processor to a dataset in a first data storage system concurrent with uninterrupted read-only access by a second host processor to a consistent state of a copy of the dataset in a second data storage system, revisions to the dataset in the first data storage system from the read-write access also being made to the copy of the dataset in the second data storage system, the revisions including a first set of revisions followed by a second set of revisions, the dataset being in a consistent state after performing each set of revisions upon the dataset, the method comprising:

a) processing the first set of revisions to build up a first directory of dataset revisions in the first set of revisions; and then b) processing the second set of revisions to build up a second directory of dataset revisions in the second set of revisions, and concurrently performing the first set of revisions upon the copy of the dataset, and concurrently performing read access on a priority basis to specified data in the dataset by accessing the first directory of dataset revisions to determine whether the specified data are in the first set of revisions, and upon finding that the specified data are in the first set of revisions, obtaining the specified data from the first set of revisions, and upon finding that the specified data are not in the first set of revisions, obtaining the data from the copy of the dataset.

10. The method as claimed in claim 9, wherein the first set of revisions are stored in a first buffer, and the second set of revisions are stored in a second buffer, and wherein the method includes storing a third set of revisions in the first buffer, and upon completion of the performance of the first set of revisions upon the copy of the dataset, processing the third set of revisions to build up a directory of the third set of revisions.

11. The method as claimed in claim 9, wherein the revisions are data to be written to blocks of storage, and the first directory of dataset revisions is an index of addresses of blocks of storage to be written to for the first set of revisions, and the second directory of dataset revisions is an index of addresses of blocks of storage to be written to for the second set of revisions.

12. The method as claimed in claim 9, wherein the dataset is a file system, the revisions include a change in the name of a file, and the revisions are specified by file access commands transmitted to the second data storage system from a remote mirroring facility in the first host processor.

13. The method as claimed in claim 9, wherein the method includes selecting a number of revisions to be included in each set of revisions in order to obtain a limited frequency of updating of the copy of the dataset.

14. The method as claimed in claim 13, wherein the method includes buffering the first set of revisions and the second set of revisions, and permitting the updating of the dataset to occur more frequently that the limited frequency when required to avoid buffer overflow.

15. The method as claimed in claim 9, wherein the first data storage system groups the revisions of the dataset into the first set of revisions and into the second set of revisions in response to transaction commit commands from the first host processor, and the first data storage system transmits the first set of revisions and the second set of revisions to the second data storage system.

16. The method as claimed in claim 15, wherein the first data storage system transmits the first set of revisions to the second data storage system by placing the first set of revisions in a first volume of storage in the first data storage system, mirroring the first volume of storage in the first data storage system to a second volume of storage in the second data storage system, transmitting the second set of revisions to the second data storage system by placing the second set of revisions in a third volume of storage in the first data storage system, and mirroring the third volume of storage to a fourth volume of storage in the second data storage system.

17. The method as claimed in claim 16, which includes the first data storage system flushing the first set of revisions to the first volume of storage in response to a transaction commit command from the first host processor, and then forwarding the transaction commit command to the second data storage system.

18. The method as claimed in claim 16, which includes the first data storage system assigning a unique sequence number to each set of revisions, and storing the sequence number for said each set of revisions when said each set of revisions is stored in one of the storage volumes.

19. The method as claimed in claim 18, wherein each storage volume has a plurality of regions, and each sequence number is mapped to a respective one of regions for storage of the set of data revisions to which said each sequence number is assigned.

20. A data storage system comprising, in combination, data storage, and a storage controller responsive to read and write commands for accessing specified data of a dataset in the data storage, wherein each set of write commands modifies the dataset from one consistent state to another, and the storage controller is programmed to respond to each set of write commands by first operating upon revisions of said each set of write commands in a write-selected phase and then operating upon the revisions of said each set of write commands in a read-selected phase, the storage controller building up a directory of the revisions of said each set of write commands in the write-selected phase, and the storage controller accessing the directory of the revisions of said each set of write commands in the read-selected phase, the storage controller performing the revisions of said each set of write commands in the read-selected phase upon the dataset, and concurrently responding to the read commands on a priority basis by accessing the directory of the revisions of said each set of write commands in the read-selected phase to obtain specified data from the revisions of said each set of write commands in the read-selected phase when the specified data are in the revisions of said each set of write commands in the read-selected phase, and when the specified data are not in the revisions of said each set of write commands in the read-selected phase, obtaining the specified data from the dataset.

21. The data storage system as claimed in claim 20, wherein the data storage system further includes a first buffer and a second buffer, and the storage controller is programmed to place the revisions of said each set of write commands alternately in either the first buffer or the second buffer and to select one of the buffers to access the revisions for one of the sets of write commands currently in the read-selected phase and to select the other of the buffers to access one of the sets of write commands currently in the write-selected phase, and to switch between the buffers to switch from the read-selected phase to the write-selected phase for the revisions of each of the sets of the write commands.

22. The data storage system as claimed in claim 21, wherein the storage controller is programmed to switch between the buffers in response to a transaction commit command.

23. The data storage system as claimed in claim 20, wherein the data storage system is a file server, the dataset is a file system, the read commands are file access commands, and the write commands are file access commands.

24. The data storage system as claimed in claim 23, wherein the directory of the revisions of said each set of write commands is a hierarchical data structure including at least a root directory, a subdirectory, and at least one file entry in the subdirectory.

25. A data storage system comprising, in combination:
   data storage, and
   a storage controller responsive to read and write commands for accessing specified data of a dataset in the data storage, the write commands specifying sets of revisions to be made to the dataset, wherein
   the storage controller is programmed to respond to transaction commit commands by alternately writing the sets of revisions to a first volume of the data storage and to a second volume of the data storage, each set of revisions to the dataset including revisions from a set of transactions defined by the transaction commit commands so that each set of revisions changes the dataset from one consistent state to another, and
   the storage controller is programmed with a remote mirroring facility for mirroring the first and second volumes to corresponding volumes in a remote data storage system.

26. The data storage system as claimed in claim 25, wherein the storage controller is programmed to respond to a transaction commit command by flushing a current set of revisions to one of the first or second volumes, the flushing operation including the remote mirroring facility transmitting the current set of revisions from said one of the first or second volumes to the remote data storage system, and then transmitting a transaction commit command to the remote data storage system.

27. The data storage system as claimed in claim 26, wherein the storage controller is programmed to select a number of revisions to be included in each set of revisions in order to obtain a limited frequency of transmission of transaction commit commands to the remote data storage system.

28. The data storage system as claimed in claim 27, wherein the storage controller is programmed to permit the frequency of transmission of transaction commit commands to the remote data storage system to exceed the limited frequency when required to avoid overflow of the first and second volumes.

29. The data storage system as claimed in claim 25, wherein the storage controller is programmed to assign a unique sequence number to each set of revisions and to store the sequence number with each set of revisions when each set of revisions is stored in one of the storage volumes.

30. The data storage system as claimed in claim 29, wherein each of said volumes has a plurality of regions, and the storage controller is programmed to map each sequence number to a respective one of the regions for storage of the set of revisions to which said each sequence number is assigned.

31. A program storage device comprising:
   a program for a storage controller of a data storage system, the program being executable by the storage controller for responding to read and write commands for accessing specified data of a dataset in data storage of the data storage system, wherein each set of write commands modifies the dataset from one consistent state to another, and the program is executable by the storage controller for responding to each set of write commands by first operating upon revisions of said each set of write commands in a write-selected phase and then operating upon the revisions of said each set of write commands in a read-selected phase, the storage controller building up a directory of the revisions of said each set of write commands in the write-selected phase, and the storage controller accessing the directory of the revisions of said each set of write commands in the read-selected phase, the storage controller performing the revisions of said each set of write commands in the read-selected phase upon the dataset, and concurrently responding to the read commands on a priority basis by accessing the directory of the revisions of said each set of write commands in the read-selected phase to obtain specified data from the revisions of said each set of write commands in the read-selected phase when the specified data are in the revisions of said each set of write commands in the read-selected phase, and when the specified data are not in the revisions of said each set of write commands in the read-selected phase, obtaining the specified data from the dataset.

32. The program storage device as claimed in claim 31, wherein the data storage system further includes a first buffer and a second buffer, and the program is executable by the storage controller for placing the revisions of said each set of write commands alternately in either the first buffer or the second buffer and to select one of the buffers to access the revisions for one of the sets of write commands currently in the read-selected phase and to select the other of the buffers to access one of the sets of write commands currently in the write-selected phase, and to switch between the buffers to switch from the read-selected phase to the write-selected phase for the revisions of each of the sets of the write commands.

33. The program storage device as claimed in claim 32, wherein the program is executable by the storage controller for switching between the buffers in response to a transaction commit command.

* * * * *